United States Patent
Vicinus et al.

(10) Patent No.: US 9,888,330 B1
(45) Date of Patent: Feb. 6, 2018

(54) DETECTING SIGNAL PROCESSING COMPONENT FAILURE USING ONE OR MORE DELAY ESTIMATORS

(71) Applicant: GetGo, Inc., Boston, MA (US)

(72) Inventors: Patrick Vicinus, Friedrichsdorf (DE); Björn Völcker, Svedala (SE)

(73) Assignee: GetGo, Inc., Boston, MA (US)

( * ) Notice: Subject to any disclaimer, the term of this patent is extended or adjusted under 35 U.S.C. 154(b) by 0 days.

(21) Appl. No.: 15/222,074

(22) Filed: Jul. 28, 2016

(51) Int. Cl.
*H04M 9/08* (2006.01)
*H04R 29/00* (2006.01)
*H04R 3/00* (2006.01)
*G10L 21/0208* (2013.01)
*G01H 7/00* (2006.01)

(52) U.S. Cl.
CPC ............ *H04R 29/001* (2013.01); *G01H 7/00* (2013.01); *G10L 21/0208* (2013.01); *H04M 9/082* (2013.01); *H04R 3/00* (2013.01); *G10L 2021/02082* (2013.01)

(58) Field of Classification Search
CPC .............................. H04M 9/082; H04R 29/001
See application file for complete search history.

(56) References Cited

U.S. PATENT DOCUMENTS

| | | | |
|---|---|---|---|
| 4,727,548 A | 2/1988 | Dickey | |
| 6,654,463 B1 * | 11/2003 | Leonidov | H04B 3/23 370/290 |
| 8,126,161 B2 | 2/2012 | Togami et al. | |
| 8,320,552 B2 * | 11/2012 | Kleijn | H04B 3/46 370/286 |
| 9,361,874 B2 * | 6/2016 | Mani | G10K 11/175 |
| 2012/0219146 A1 * | 8/2012 | Mason | H04M 9/082 379/406.01 |

* cited by examiner

*Primary Examiner* — Nafiz E Hoque
(74) *Attorney, Agent, or Firm* — BainwoodHuang

(57) ABSTRACT

One or more delay estimators are used to detect failure in a signal processing component, such as an acoustic echo canceller. A first delay estimator is used to generate i) an estimated post-processing delay between when a known audio signal was conveyed to a loudspeaker, and when a portion of the processed audio signal that includes the known audio signal was output from the signal processing component, and ii) a confidence level for the estimated post-processing delay. A failure of the signal processing component may be detected in response to the estimated post-processing delay exceeding a threshold. A second delay estimator may also be used to generate an estimated pre-processing delay and a confidence level for the estimated pre-processing delay for comparison to the estimated post-processing delay and confidence level for the estimated post-processing delay in order to provide further failure detection accuracy and specificity.

19 Claims, 14 Drawing Sheets

DETECTING SIGNAL PROCESSING COMPONENT FAILURE USING ONE OR MORE DELAY ESTIMATORS

BACKGROUND

Communication technologies are currently available that enable two or more geographically diverse users to participate in real-time voice communication sessions over one or more communication networks. In order to facilitate such voice communication sessions, certain types of signal processing components are commonly used to suppress known interferences that may occur. Acoustic echo cancellers are an important example of such signal processing components. Acoustic echo cancellers improve the quality of voice communications during a communication session by removing echo from an audio signal prior to conveying the signal to one or more participants. Acoustic echo cancellers are generally implemented digitally, using a digital signal processor and/or software.

SUMMARY

Many conditions may result in the partial or even complete failure of an acoustic echo canceller. For example, acoustic echo cancellers may rely on a known time difference between the playout of a first audio signal, e.g. through a loudspeaker, and the capture of a second audio signal from which the first audio signal may need to be removed, e.g. through a microphone. However, certain system components may introduce an unanticipated additional delay that can reduce or even eliminate the effectiveness of an acoustic echo canceller. Such additional delay may, for example, result from connecting loudspeakers over a wireless communication network, such as a communication channel based on the Bluetooth wireless communication standard, and/or from using certain types of interconnecting cables, such as High-Definition Multimedia Interface (HDMI) cables. Many other specific conditions may also result in partial or complete acoustic echo cancellation component failure, including without limitation the presence of distortion and/or noise in the audio signal.

Unfortunately, previous approaches to detecting the failure of an acoustic echo canceller have exhibited significant shortcomings. Some previous approaches have operated by calculating specific metrics indicating the current effectiveness of the acoustic echo canceller. These metrics include Echo Return Loss Enhancement (ERLE), which is a measurement of how much echo has been reduced by the acoustic echo canceller. In general, previous systems have measured such metrics under constrained conditions, in which no noise or speech from the local microphone is present, and such previous approaches cannot effectively evaluate acoustic echo canceller performance during a real-time communication session unless the echo can be separated from the remaining audio signal. Since separation of the echo from the remaining audio signal has often been performed internally as part of the acoustic echo canceller logic, many acoustic echo cancellers have internally calculated performance metrics during operation. However, under conditions in which the acoustic echo canceller logic itself is failing, internal calculation of performance metrics such as ERLE also breaks down. It would accordingly be desirable to have a new failure detection technique for use with signal processing components such as acoustic echo cancellers, that can detect failure independently from the operation of the signal cancelling component itself, and that can be effective in detecting failures even during normal communication conditions.

To address the above and other shortcomings of previous systems, new techniques are disclosed herein that use one or more delay estimators to detect signal processing component failure. In the disclosed techniques, failure of an acoustic echo cancelling component in an endpoint device is detected by first conveying a known audio signal i) to a loudspeaker communicably coupled to the endpoint device, wherein the loudspeaker outputs the known audio signal as sound, and ii) to a post-processing delay estimator. A processed audio signal is generated by the acoustic echo cancelling component in response to a microphone audio signal received by the acoustic echo cancelling component from a microphone contained in or connected to the endpoint device, and is also conveyed to the post-processing delay estimator.

In response to the known audio signal and the processed audio signal, the post-processing delay estimator calculates an estimated post-processing delay and a confidence level for the estimated post-processing delay. The estimated post-processing delay is an estimate of the amount of time between when the known audio signal was conveyed to the loudspeaker, and when a portion of the processed audio signal that includes the known audio signal was output from the acoustic echo cancelling component. The confidence level for the estimated post-processing delay is a probability that the estimated post-processing delay is the actual amount of time between when the known audio signal was conveyed to the loudspeaker and when the portion of the processed audio signal that includes the known audio signal was output from the acoustic echo cancelling component.

The confidence level for the estimated post-processing delay may then be compared to a minimum confidence level threshold. In response to detecting that the confidence level for the estimated post-processing delay exceeds the minimum confidence level threshold, the disclosed techniques detect that the acoustic echo cancelling component has failed, and an indication that the acoustic echo cancelling component has failed may be stored in the endpoint device, e.g. within a performance log associated with the acoustic echo cancelling component, and/or may be reported to a user of the endpoint device, e.g. as a warning indicating that the acoustic echo cancelling component has failed that is displayed to the user of the endpoint device through a user interface of the endpoint device. Such a warning may, for example, be provided prior to the start of a real-time voice communication session, or during a real-time voice communication session.

In some cases the acoustic echo cancelling component may be adjusted or reset in response to detecting that the confidence level for the estimated post-processing delay exceeds the minimum confidence level threshold, in order to improve the performance of the acoustic echo cancelling component. For example, the estimated post-processing delay may be passed to the acoustic echo cancelling component in response to detecting that the confidence level for the estimated post-processing delay exceeds the minimum confidence level threshold, thus enabling the acoustic echo cancelling component to adjust its echo cancelling operation based on the estimated post-processing delay. In another example the acoustic echo cancelling component may be reset in response to detecting that the confidence level for the estimated post-processing delay exceeds the minimum confidence level threshold, thus enabling the acoustic echo cancelling component to run its own, built-in performance correcting operations.

The disclosed techniques may further be embodied to include a pre-processing delay estimator. In such an embodiment, the known audio signal is also conveyed to the pre-processing delay estimator, and the microphone audio signal is conveyed to the pre-processing delay estimator. In response to the known audio signal and the microphone audio signal, the pre-processing delay estimator calculates an estimated pre-processing delay and a confidence level for the estimated pre-processing delay. The estimated pre-processing delay is an estimate of the amount of time between when the known audio signal was conveyed to the loudspeaker and when a portion of the microphone audio signal that includes the known audio signal was conveyed from the microphone. The confidence level for the estimated pre-processing delay is a probability that the estimated pre-processing delay is the actual amount of time between when the known audio signal was conveyed to the loudspeaker and when the portion of the microphone audio signal that includes the known audio signal was conveyed from the microphone. The estimated pre-processing delay may then be compared to the estimated post-processing delay, and the confidence level for the estimated pre-processing delay may then be compared to the confidence level for the estimated post-processing delay. The information stored regarding the failure of the acoustic echo cancelling component, and/or any warning generated to notify the user of the endpoint device that the acoustic echo cancelling component has failed, may then be generated to more accurately reflect the degree to which the acoustic echo cancelling component has failed in response to the comparison of the estimated pre-processing delay to the estimated post-processing delay, and to the comparison of the confidence level for the estimated pre-processing delay to the confidence level for the estimated post-processing delay. For example, in response to detecting that the estimated pre-processing delay and the estimated post-processing delay are substantially equal, and that the confidence level for the estimated pre-processing delay and the confidence level for the estimated post-processing delay are substantially equal, the indication that the acoustic echo cancelling component has failed may include an indication that the acoustic echo cancelling component has completely failed.

In another example, in response to detecting that the estimated pre-processing delay and the estimated post-processing delay are substantially equal and that the confidence level for the estimated pre-processing delay is greater than the confidence level for the estimated post-processing delay, the indication that the acoustic echo cancelling component has failed may include an indication that the acoustic echo cancelling component has partially failed. And in another example, in response to detecting that the confidence level for the estimated pre-processing delay is less than the confidence level for the estimated post-processing delay, the indication that the acoustic echo cancelling component has failed may include an indication that the acoustic echo cancelling component is generating echo.

The known audio signal may consist of or include audio of a real-time communication session that is received by the endpoint device during the real time communication session. Alternatively, or in addition, the known audio signal may consist of or include a test audio signal that is generated in the endpoint device. The generated test audio signal may be outside the range of human hearing, allowing the test audio signal to be generated during a real-time voice communication session without interfering with the real-time voice communication session.

In one embodiment of the disclosed techniques, conveying the known audio signal to the post-processing delay estimator may include extracting a first sequence of patterns from the known audio signal. Each pattern in the first sequence of patterns contains at least one characteristic of a corresponding frame interval of the known audio signal. Conveying the processed audio signal to the post-processing delay estimator may similarly include extracting a second sequence of patterns from the processed audio signal. Each pattern in the second sequence of patterns contains at least one characteristic of a corresponding frame interval of the processed audio signal. In such an embodiment, calculating the estimated post-processing delay by the post-processing delay estimator may include, for each pattern in the first sequence of patterns, a) determining a pattern in the second sequence of patterns that is most similar to the pattern, and b) calculating an inter-pattern delay equal to an amount of time between the frame interval of the known audio signal corresponding to the pattern and the frame interval of the processed audio signal corresponding to the pattern in the second sequence of patterns that is most similar to the pattern. After all the patterns in the first sequence have been processed in this way, the estimated post-processing delay may then be set to the most frequently calculated inter-pattern delay. Further in such an embodiment, calculating the confidence level for the estimated post-processing delay by the post-processing delay estimator may include i) counting a total number of calculated inter-pattern delays that equal the estimated post-processing delay, and ii) setting the confidence level for the estimated post-processing delay to a ratio between a) the total number of calculated inter-pattern delays that equal the estimated post-processing time delay, and b) a total number of patterns in the first sequence.

The disclosed techniques may be embodied to provide various advantages over previous systems. The disclosed techniques operate independently to and externally from the signal processing component, and accordingly can detect the failure of signal processing components such as an acoustic echo cancelling component, even while the signal processing component itself is partially or even completely failing, and do not rely on additional features that may or may not be provided by the signal processing component, such as separation of echo signals. The disclosed techniques also do not require any special testing conditions to be effective, and can therefore be effective in detecting failures during normal communication conditions.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that such embodiments are provided only by way of example and to illustrate various features and principles of the invention, and that the invention itself is broader than the specific examples of embodiments disclosed herein.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
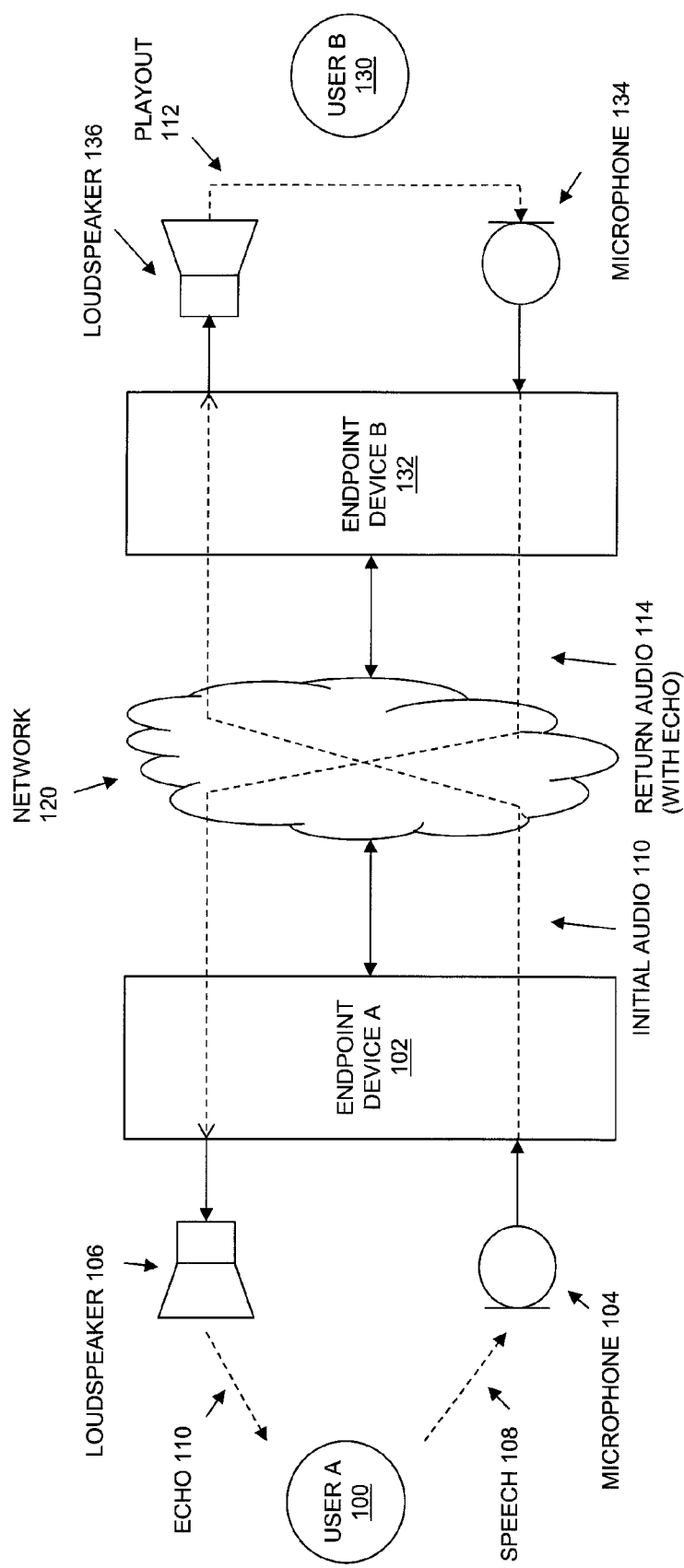
FIG. 1 is a block diagram illustrating the presence of echo during a real-time audio communication.

FIG. 1 is a block diagram illustrating the presence of echo during a real-time audio communication. As shown in FIG. 1, Endpoint Device A 102 and Endpoint Device B 132 are connected for a real-time audio communication session via Network 120. Endpoint devices such as Endpoint Device A 102 and Endpoint Device B 132 may each consist of or include any specific type of device that is operable to provide a real-time audio communication session. A real-time audio communication session may consist of or include any specific type of real-time communication between multiple geographically distributed users that includes audio communication, such as a phone call, Web conference, online meeting, etc.

In the example of FIG. 1 Endpoint Device A 102 and Endpoint Device B 132 are each equipped with at least one microphone and at least one loudspeaker, shown by Microphone 104 and Loudspeaker 106 for Endpoint Device A 102, and by Microphone 134 and Loudspeaker 136 for Endpoint Device B 132. Each microphone picks up the audio to be transmitted to the other endpoint device, and each loudspeaker plays out the audio sent from the other endpoint device. Accordingly, when User A 100 speaks, Microphone 104 picks up the resulting Speech 108 as audio, which is transmitted as Initial Audio 110 to Endpoint Device B 132. At Endpoint Device B 132 Initial Audio 110 is played out of Loudspeaker 136 as sound, shown by Playout 112. Microphone 134 at Endpoint Device B 132 captures Playout 112, which is then transmitted back to Endpoint Device A 102 as Return Audio 114, and played out of Loudspeaker 106 as Echo 110. As a result of Echo 110, User A 100 will hear him or herself speaking. Echo degrades the user experience during a real-time audio communication session, and may even make it impossible for users to have a real-time conversation.

Figure 2:
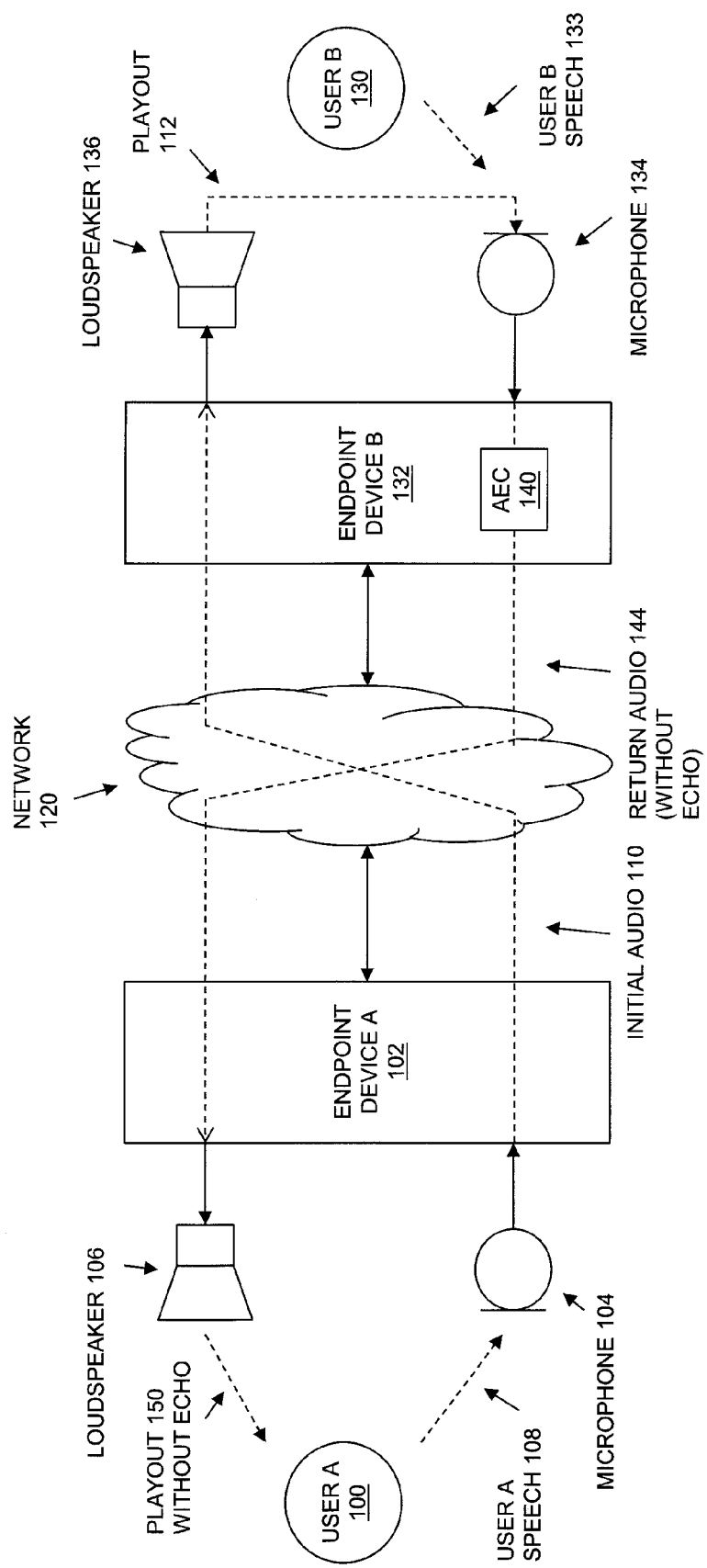
FIG. 2 is a block diagram illustrating the use of an acoustic echo cancelling component to remove echo from a real-time audio communication.

FIG. 2 is a block diagram illustrating the use of an acoustic echo canceller to remove echo from a real-time audio communication session. In FIG. 2, Endpoint Device B 132 has been equipped with an acoustic echo cancelling component, shown by AEC 140. AEC 140 processes the audio signal it receives from Microphone 134 prior to transmission of Return Audio 144 from Endpoint Device B 132. As shown in FIG. 2, the audio signal output from Microphone 134 may consist of both the desired speech from User B 130, shown by User B Speech 133, as well as the sound played out by Loudspeaker 136, shown by Playout 112. AEC 140 operates by removing Playout 112 from the combined audio signal received from the Microphone 134, leaving only User B Speech 133 for transmission to Endpoint Device A 102 in Return Audio 144. When AEC 140 is operating correctly, Return Audio 144 is echo-free, resulting in Playout 150 from Loudspeaker 106 having no echo.

Figure 3:
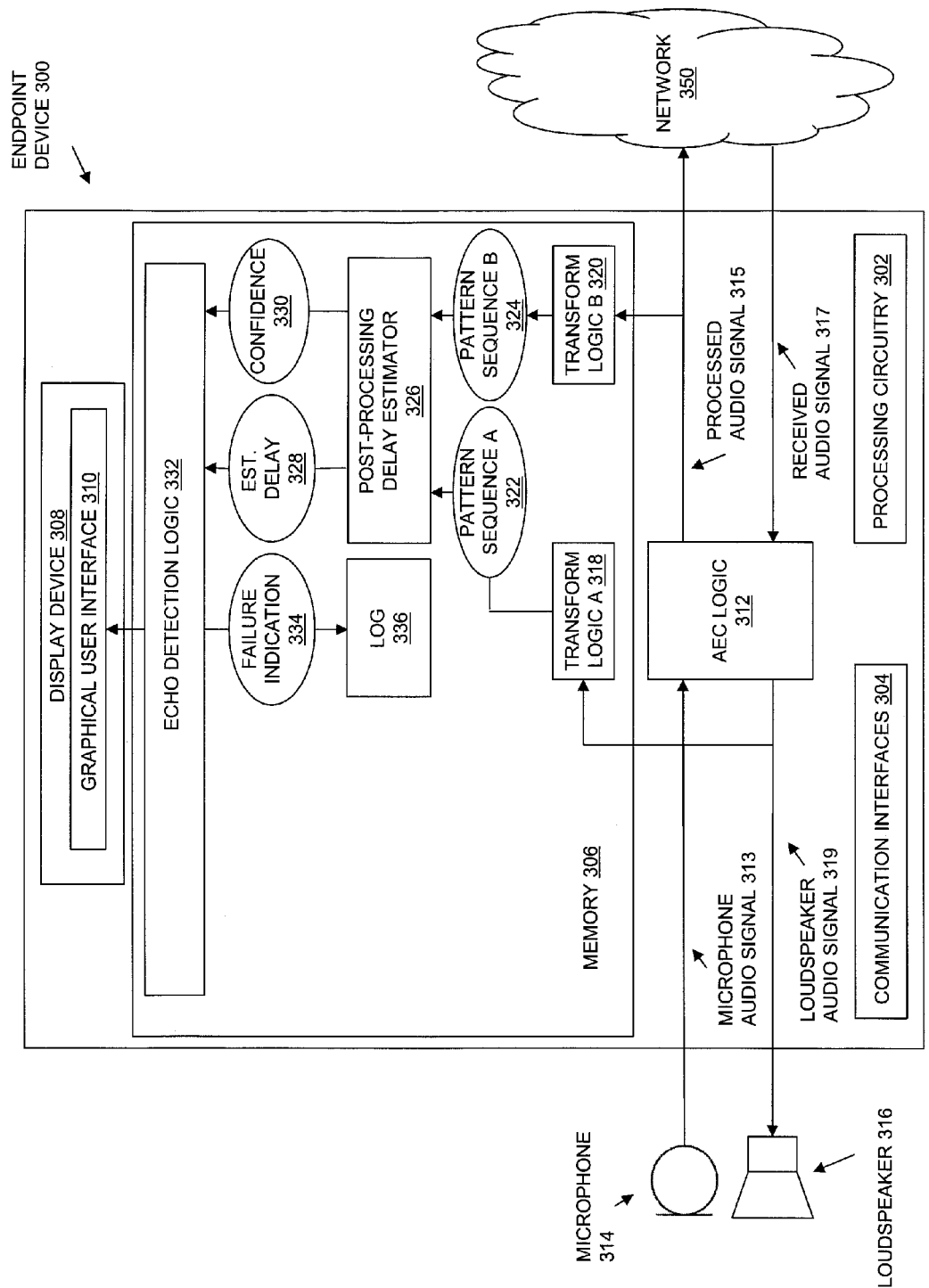
FIG. 3 is a block diagram showing an embodiment in which a single delay estimator is used to detect failure in the acoustic echo cancelling component.

FIG. 3 is a block diagram showing an embodiment in which a single delay estimator is used to detect failure of an acoustic echo cancelling component. As shown in FIG. 3, an Endpoint Device 300 may be communicably connected to a Network 350. Endpoint Device 300 may consist of or include any type of device operable to provide real-time audio communications, such as a phone (e.g. cell phone, Voice over IP phone, landline phone, etc.), and/or a computer (e.g. tablet, laptop, desktop, etc.). Network 350 may consist of or include one or more computer and/or communication networks, such as a wide area network (e.g. the Internet), a local area network, a cellular network and/or the public switched telephone network (PSTN).

Endpoint Device 300 may include Processing Circuitry 302, Communication Interface(s) 304, Display Device 308, Microphone 314, Loudspeaker 316, and Memory 306. Processing Circuitry 302 may, for example, include or consist of one or more integrated circuits that provide the functions of a central processing unit (CPU), such as one or more microprocessors or the like. Communication Interface(s) 304 may, for example, include or consist of one or more conventional network interface cards (NICs) or the like that are operable to communicably connect Endpoint Device 300 to one or more computer or communication networks, shown by Network 350, and/or one or more conventional telephony interfaces, and/or any other specific types of communication interfaces that enable Endpoint Device 300 to participate in real-time audio communications over Network 350. Display Device 308 may include or consist of any specific type of electronic visual display that is operable to present information in visual form.

Microphone 314 and Loudspeaker 316 may be integral to or communicably connected to Endpoint Device 300. The Microphone Audio Signal 313 output from Microphone 314 is conveyed as an input to the acoustic echo cancelling component, shown by AEC Logic 312. AEC Logic 312 may consist of or include hardware and/or software. For example AEC Logic 312 may consist of or include dedicated hardware such as a digital signal processor, and/or program code executable on such dedicated hardware and/or on Processing Circuitry 302. AEC Logic 312 also receives as input Received Audio Signal 317 that is received by Endpoint Device 300 from Network 350 (e.g. through Communication Interfaces 304). Received Audio Signal 317 contains audio originating from one or more other endpoint devices during the real-time communication session. AEC Logic 312 also outputs Received Audio Signal 317 as or within Loudspeaker Audio Signal 319, which is conveyed to Loudspeaker 316 for output by Loudspeaker 316 as sound. During correct operation, in response to receipt of Microphone Audio Signal 313 from Microphone 314, AEC Logic 312 performs echo cancellation on Microphone Audio Signal 313 by removing the Received Audio Signal 317 from Microphone Audio Signal 313, in this way generating an echo-free Processed Audio Signal 315 that is output from AEC Logic 312 for subsequent transmission over Network 350, e.g. to the one or more other endpoint devices from which audio is also received during the real-time communication session.

Memory 306 may include or consist of any specific type of volatile or non-volatile semiconductor memory or the like that is operable to store programs (e.g. sequences of instructions) for execution by Processing Circuitry 302 and/or AEC Logic 312, and/or data (e.g. program state information, input data, output data, etc.) for use by the programs executing in the Endpoint Device 300. Program code stored in Memory 306 for execution by the Processing Circuitry 302, is shown including Post-Processing Delay Estimator 326, Echo Detection Logic 332, Transform Logic A 318, and Transform Logic B 320. Those skilled in the art will recognize that while for purposes of concise illustration and explanation only certain examples of program code and related data structures are shown herein, other specific program code and/or data may also be present in Memory 306. Such additional software may, for example, include operating system, middleware, and/or various other specific types of application program code.

As further described below with reference to FIG. 4, during operation of the embodiment shown in FIG. 3, the program code stored in Memory 306, when executed on Processing Circuitry 302, operates to detect failure of AEC Logic 312.

Figure 4:
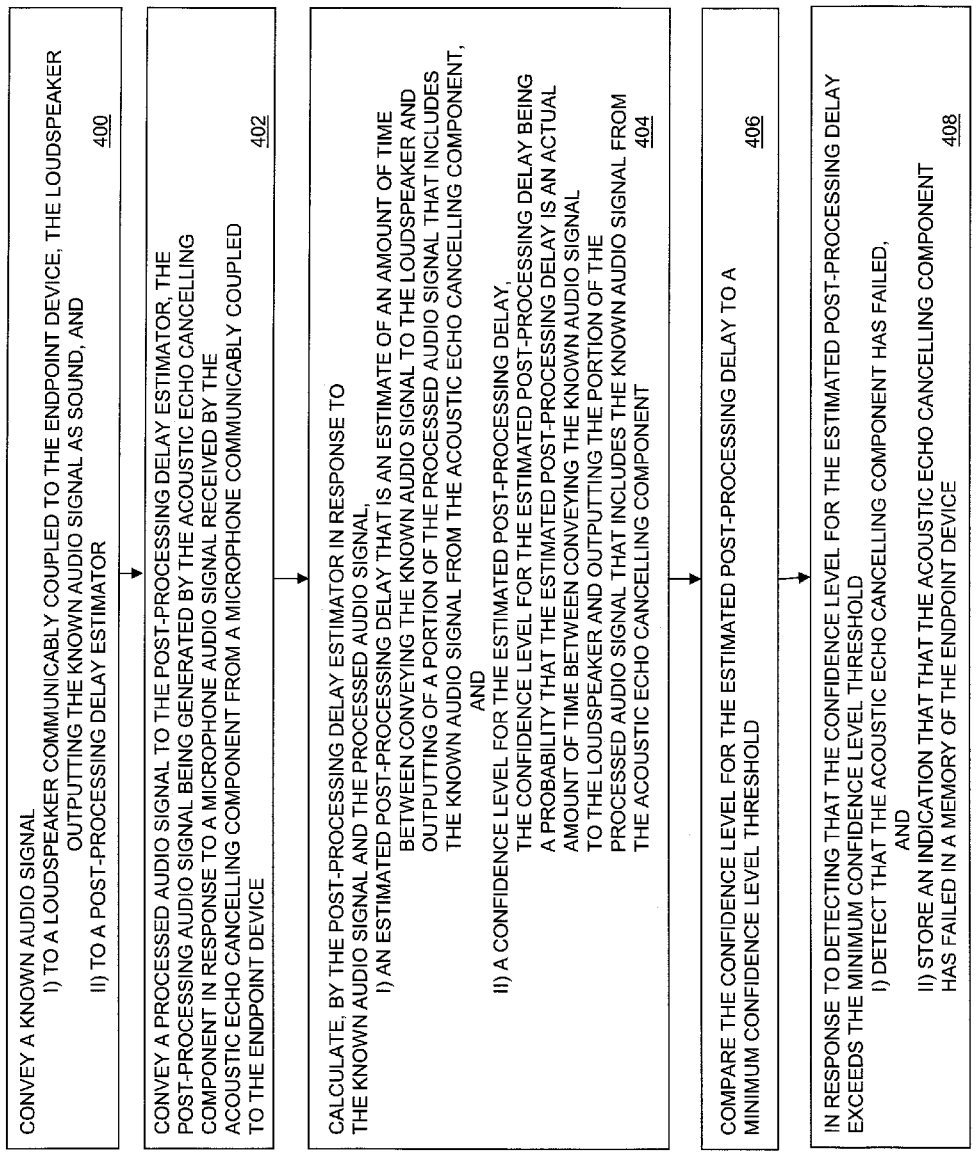
FIG. 4 is a flow chart showing an example of steps performed to detect failure in the acoustic echo cancelling component using the disclosed techniques.

FIG. 4 is a flow chart showing an example of steps performed by the embodiment shown in FIG. 3 to detect failure in AEC Logic 312. At step 400, a known audio signal is conveyed i) to Loudspeaker 316 for output by Loudspeaker 316 as sound, and ii) to Post-Processing Delay Estimator 326. For example, as shown in FIG. 3, Endpoint Device 300 receives Received Audio Signal 317 from Network 350 (e.g. through Communication Interfaces 304). Received Audio Signal 317 contains audio originating from one or more other endpoint devices. Received Audio Signal 317 may consist of or include audio of a real-time communication session between a user of Endpoint Device 300 and the users of the other endpoint devices, and that is received by Endpoint Device 300 during the real time communication session. Received Audio Signal 317 is also output by AEC Logic 312 as Loudspeaker Audio Signal 319, and Loudspeaker Audio Signal 319 is an example of a known audio signal that is conveyed to Loudspeaker 316 for output by Loudspeaker 316 as sound, and that may also be conveyed to Post-Processing Delay Estimator 326, e.g. through Transform Logic A 318. While the example of FIG. 3 shows that Loudspeaker Audio Signal 319 may be conveyed to Post-Processing Delay Estimator 326 through Transform Logic A 318 as Pattern Sequence A 322, the disclosed techniques are not limited to such an approach, and alternatively Loudspeaker Audio Signal 319 may be passed directly to Post-Processing Delay Estimator 326, without conversion by Transform Logic A 318 to Pattern Sequence A 322.

At step 402, the Processed Audio Signal 315 that was generated by the AEC Logic 312 in response to receipt of the Microphone Audio Signal 313 from Microphone 314 is also conveyed to Post-Processing Delay Estimator 326. While the example of FIG. 3 shows that Processed Audio Signal 315 may be conveyed through Transform Logic B 320 to Post-Processing Delay Estimator 326 as Pattern Sequence B 324, the disclosed techniques are not limited to such an approach, and alternatively Processed Audio Signal 315 may be passed directly to Post-Processing Delay Estimator 326, without conversion by Transform Logic B 320 to Pattern Sequence B 324.

In the case where Loudspeaker Audio Signal 319 is passed through Transform Logic A 318, and where Processed Audio Signal 315 is passed through Transform Logic B 320, Transform Logic A 318 and Transform Logic B 320 are typically embodied to perform the same transformation on the respective signals. Such transformation results in patterns (e.g. within Pattern Sequence A 322 and Pattern Sequence B 324) that are indicative of the audio that is intended to be removed by the AEC Logic 312.

At step 404, Post-Processing Delay Estimator 326 calculates, in response to the known audio signal and the Processed Audio Signal 315, Estimated Delay 328, which is an estimated post-processing delay, and Confidence 330, which is a confidence level for the estimated post-processing delay. Estimated Delay 328 is an estimate of the amount of time between when the known audio signal was conveyed to Loudspeaker 316, and when a portion of the Processed Audio Signal 315 that includes the known audio signal was output from the AEC Logic 312. Confidence 330 is a probability that Estimated Delay 328 is the actual amount of time between when the known audio signal was conveyed to Loudspeaker 316 and when the portion of the Processed Audio Signal 315 that includes the known audio signal was output from the AEC Logic 312. Estimated Delay 328 and Confidence 330 are conveyed from Post-Processing Delay Estimator 326 to Echo Detection Logic 332.

At step 406, the Echo Detection Logic 332 compares Confidence 330 to a minimum confidence level threshold. The minimum confidence level threshold may be preset or user configured, and/or dynamically adjusted based on previous results, as may be appropriate for a given operational environment or deployment. Any specific minimum confidence level threshold value may be used. For example, a relatively low value of minimum confidence level threshold, e.g. 60 percent, may be used for a relatively sensitive configuration yielding a relatively high number of failure detections, but also with a relatively high rate of incorrect failure detections (also known as "false positives"). Alternatively, a relatively high value of minimum confidence level threshold, e.g. 90 percent, may be used for a less sensitive configuration yielding a relatively low number of failure detections, but with a relatively low rate of incorrect failure detections.

At step 408, in response to detecting that Confidence 330 exceeds the minimum confidence level threshold, the Echo Detection Logic 332 detects that AEC Logic 312 has failed. Further at step 408, in response to detecting that Confidence 330 exceeds the minimum confidence level threshold, Echo Detection Logic 332 stores an indication (e.g. Failure Indication 334) that AEC Logic 312 has failed, in the Memory 306 of Endpoint Device 300. For example, Echo Detection Logic 332 may store a log entry within a performance log associated with AEC Logic 312, shown by Log 336. Failure Indication 334 may, for example, consist of or include a probability that AEC Logic 312 has failed. Such a probability may, for example, be equal to Confidence 330. Alternatively, or in addition, in response to detecting that Confidence 330 exceeds the minimum confidence level threshold, Echo Detection Logic 332 may report the failure of AEC Logic 312 to a user of Endpoint Device 300, e.g. by generating a visual warning in a visual display (e.g. within a pop-up window or the like) provided in Graphical User Interface 310, indicating to the user that AEC Logic 312 has failed. Such a warning may, for example, be provided prior to the start of a real-time voice communication session, as part of a test process for determining whether the real-time voice communication session can effectively be held, or after the a real-time voice communication session has begun.

In some cases AEC Logic 312 may include an interface that can be used to provide various configuration parameters or the like to AEC Logic 312. For example, AEC Logic 312 may include an Application Programming Interface (API) or the like that enables Echo Detection Logic 332 to adjust or tune the echo cancelling operation of AEC Logic 312, or to simply reset AEC Logic 312, in response to detecting that the confidence level for the estimated post-processing delay exceeds the minimum confidence level threshold, in order to improve the performance of AEC 312. For example, Echo Detection Logic 332 may pass the estimated post-processing delay (e.g. Estimated Logic 328) to AEC Logic 312 in response to detecting that the confidence level for the estimated post-processing delay exceeds the minimum confidence level threshold, thus enabling AEC Logic 312 to adjust its echo cancelling operation based on the estimated post-processing delay. In another example, Echo Detection Logic 332 may reset AEC Logic 312 in response to detecting that the confidence level for the estimated post-processing delay exceeds the minimum confidence level threshold, thus enabling AEC Logic 312 to run its own, built-in performance correcting operations.

Instead of comparing Confidence 330 to a minimum confidence level at step 406, and performing step 408 only in response to Confidence 330 exceeding the minimum confidence level, Echo Detection Logic 332 may alternatively store each Confidence 330 that is generated by Post-Processing Delay Estimator 326 into a log entry within Log 336 as a probability that AEC Logic 312 has failed, regardless of the value of Confidence 330.

Figure 5:
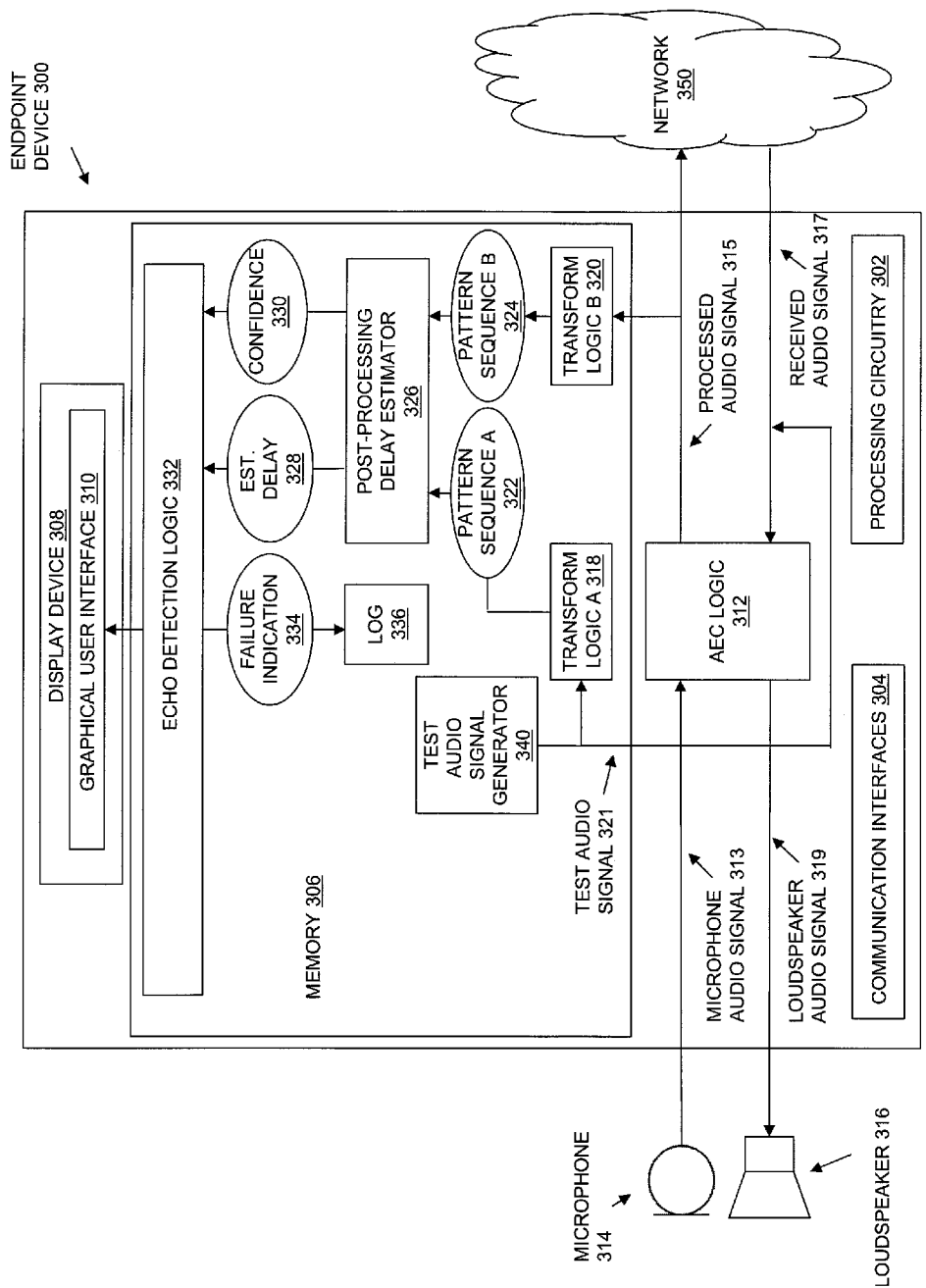
FIG. 5 is a block diagram showing an embodiment in which a single delay estimator is used to detect failure of the acoustic echo cancelling component, and in which a test audio signal generator is used to generate an artificial test audio signal.

FIG. 5 is a block diagram showing an embodiment in which a single delay estimator is used to detect failure of the acoustic echo cancelling component, and in which a test audio signal generator is used to generate an artificial test audio signal. As described above, the known audio signal conveyed to Post-Processing Delay Estimator 326 may consist of or include audio of a real-time communication session that is received by Endpoint Device 300 during the real time communication session, that is also passed to Loudspeaker 316 as Loudspeaker Audio Signal 319 for output as sound by Loudspeaker 316. Alternatively, or in addition, the known audio signal passed to both Loudspeaker 316 and Post-Processing Delay Estimator 326 may consist of or include a test audio signal that is generated in the endpoint device, such as, for example, a specific tone, a ring tone, noise, etc. For example, a Test Audio Signal Generator 340 may be provided (e.g. as program code executable on Processing Circuitry 302) to generate a Test Audio Signal 321. As shown in FIG. 5, Test Audio Signal 321 may be passed as the known audio signal to Post-Processing Delay Estimator 326, either directly or through Transform Logic A 318 as Pattern Sequence A 322. Test Audio Signal 321 may also be added to the Received Audio Signal 317, prior to the AEC Logic 312, resulting in a Loudspeaker Audio Signal 319 output from AEC Logic 312 that includes the Test Audio Signal 321, as well as any audio in Received Audio Signal 317 that might be present. In the case where an audible Test Audio Signal 321 is used, Test Audio Signal 321 may preferably be generated when no real-time audio communication is being performed, and accordingly in such a case Loudspeaker Audio Signal 319 would contain only the Test Audio Signal 321. Alternatively, a Test Audio Signal 321 may be generated by Test Audio Signal Generator 340 that is outside the range of human hearing (i.e. in frequencies greater than 20 kHz), thus allowing the Test Audio Signal 321 to be safely generated during a real-time voice communication session without interfering with the real-time voice communication session. In such a case, adding Test Audio Signal 321 to a received audio signal would result in Loudspeaker Audio Signal 319 including both audio of a real-time audio communication session and the Test Audio Signal 321, but without interfering with the ongoing real-time audio communication session. Those skilled in the art will recognize that when Test Audio Signal 321 generated by Test Audio Signal Generator 340 is outside the range of human hearing, in order for the disclosed techniques to operate correctly, Loudspeaker 316 must be operable to output such high frequency content, Microphone 314 must also be operable to pick up such high frequency content, and AEC Logic 312 must also be capable of operation in the higher frequency band.

Figure 6:
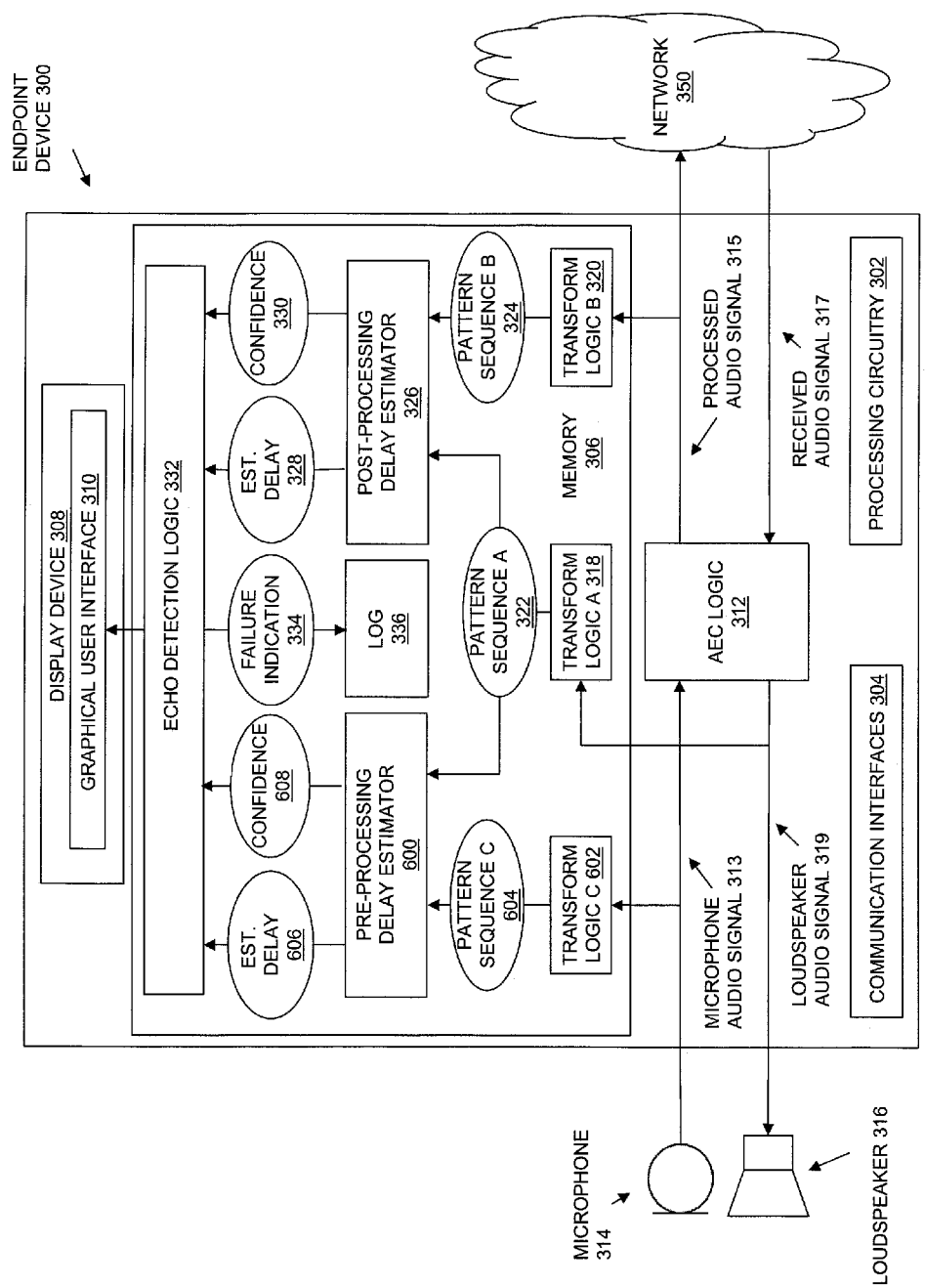
FIG. 6 is a block diagram showing an embodiment in which two delay estimators are used to detect failure in the acoustic echo cancelling component.

FIG. 6 is a block diagram showing an embodiment in which two delay estimators are used to detect failure in the acoustic echo cancelling component. In the embodiment of FIG. 6, the program code stored in Memory 306 for execution by the Processing Circuitry 302 further includes Pre-Processing Delay Estimator 600, and Transform Logic C 602. As further described below with reference to FIG. 7, during operation of the embodiment shown in FIG. 6, the program code stored in Memory 306, when executed on Processing Circuitry 302, operates to detect failure of AEC Logic 312.

Figure 7:
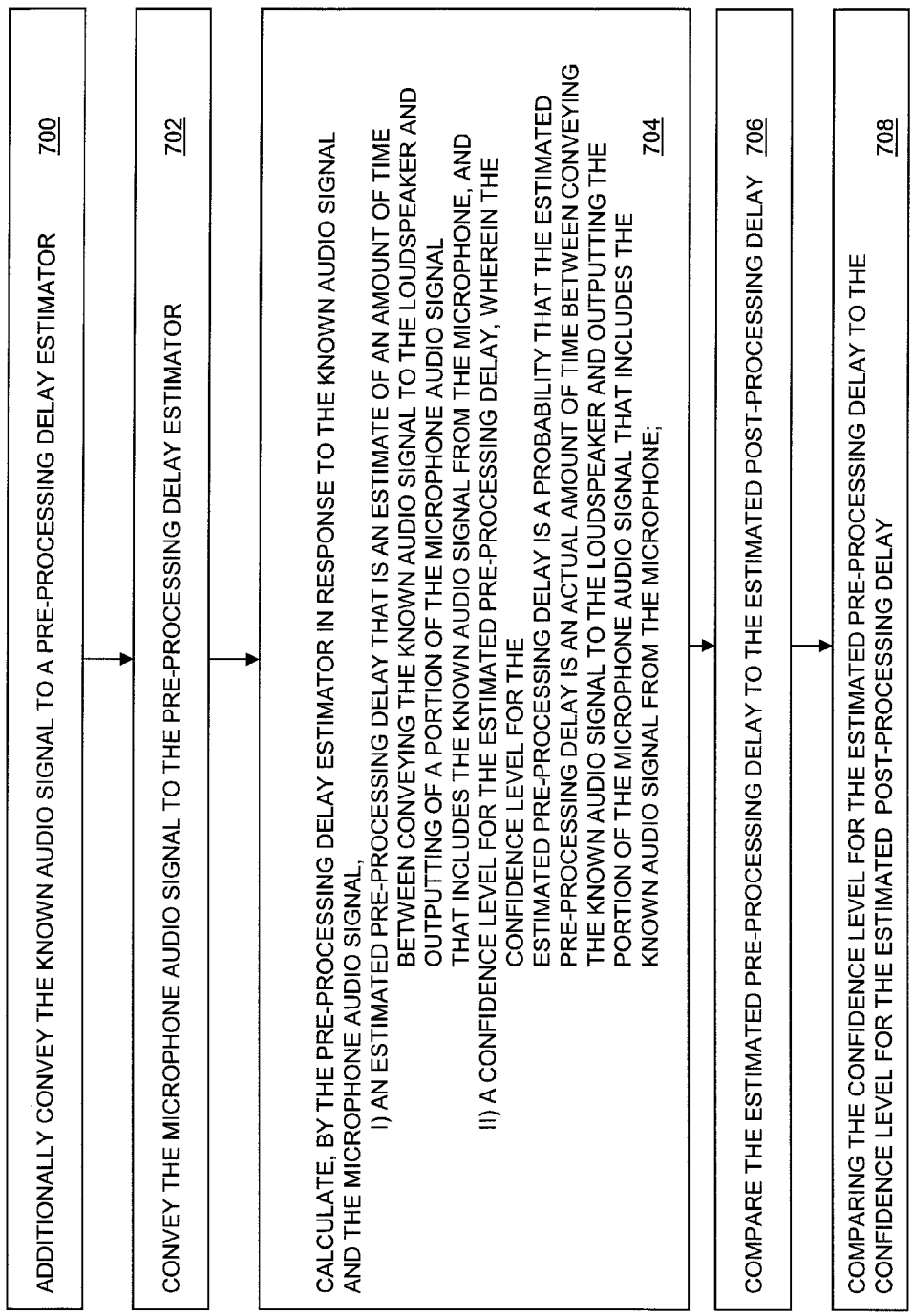
FIG. 7 is a flow chart showing an example of steps that may be performed in an embodiment in which two delay estimators are used to detect failure of the acoustic echo cancelling component.

FIG. 7 is a flow chart showing an example of steps that may be performed by the embodiment shown in FIG. 6 to detect failure of the AEC Logic 312. At step 700, the known audio signal that, as described above, is conveyed to Loudspeaker 316 for output by Loudspeaker 316 as sound, and that is also conveyed to Post-Processing Delay Estimator 326, is additionally conveyed to Pre-Processing Delay Estimator 600. Loudspeaker Audio Signal 319 is an example of a known audio signal that is conveyed to Loudspeaker 316 for output by Loudspeaker 316 as sound, and that may also be conveyed to Post-Processing Delay Estimator 326, and additionally conveyed to Pre-Processing Delay Estimator 600, e.g. through Transform Logic A 318. While the example of FIG. 6 shows that Loudspeaker Audio Signal 319 may be conveyed to Post-Processing Delay Estimator 326 and Pre-Processing Delay Estimator 600 through Transform Logic A 318 as Pattern Sequence A 322, the disclosed techniques are not limited to such an approach, and alternatively Loudspeaker Audio Signal 319 may be passed directly to Post-Processing Delay Estimator 326 and Pre-Processing Delay Estimator 600, without conversion by Transform Logic A 318 to Pattern Sequence A 322.

At step 702, Microphone Audio Signal 313 is conveyed to Pre-Processing Delay Estimator 600. While in the example of FIG. 6, Microphone Audio Signal 313 is conveyed to Pre-Processing Delay Estimator 600 through Transform Logic C 602 as Pattern Sequence C 604, the disclosed techniques are not limited to such an approach, and alternatively Microphone Audio Signal 313 may be passed directly to Pre-Processing Delay Estimator 600, without conversion by Transform Logic C 602 to Pattern Sequence C 604. In the case where Microphone Audio Signal 313 is passed through Transform Logic C 602, Transform Logic C 602 is typically embodied to perform the same transformation on Microphone Audio Signal 313 as is performed by Transform Logic A 318 and Transform Logic B 320, resulting in patterns (e.g. within Pattern Sequence C 604) that are indicative of the audio that is intended to be removed by the AEC Logic 312.

At step 704, in response to the known audio signal and the Microphone Audio Signal 313, the Pre-Processing Delay Estimator 600 calculates Estimated Delay 606, which is an estimated pre-processing delay, and Confidence 608, which is a confidence level for the estimated pre-processing delay. Estimated Delay 606 is an estimate of the amount of time between when the known audio signal was conveyed to the Loudspeaker 316, and when a portion of the Microphone Audio Signal 313 that includes the known audio signal was conveyed from the Microphone 314 as an output to the AEC Logic 312. Confidence 608 is a probability that Estimated Delay 606 is the actual amount of time between when the known audio signal was conveyed to the Loudspeaker 316 and when the portion of the Microphone Audio Signal 313 that includes the known audio signal was conveyed from the Microphone 314 as an output to the AEC Logic 312. Estimated Delay 606 and Confidence 608 are conveyed from Pre-Processing Delay Estimator 600 to Echo Detection Logic 332.

At step 706, Echo Detection Logic 332 compares Estimated Delay 606, which is the estimated pre-processing delay, to Estimated Delay 328, which is the estimated post-processing delay. At step 708, Echo Detection Logic 332 compares Confidence 608, which is the confidence level for the estimated pre-processing delay, to Confidence 330, which is the confidence level for the estimated post-processing delay.

The result of comparing Estimated Delay 606 to Estimated Delay 328 may be used to increase reliability by calculating a weighting value that is a function of the difference between Estimated Delay 606 and Estimated Delay 328, and then multiplying the output of Echo Detector Logic 332 by the weighting value. For example, Failure Indication 334 may, for example, consist of or include a probability that AEC Logic 312 has failed, equal to Confidence 330 multiplied by a weighting value that is a function of the difference between Estimated Delay 606 and Estimated Delay 328. The specific function used to generate the weighting value may be derived by an empiric approach, and have a maximum weighting value at a zero difference between Estimated Delay 606 and Estimated Delay 328 (indicating a high probability of echo), and be monotonically decreasing for larger differences between Estimated Delay 606 and Estimated Delay 328.

The results of the comparisons performed at steps 704 and 706 may also be used to generate more accurate information to be stored in the Endpoint Device 300 or displayed to a user of Endpoint Device 300 regarding a failure detected in AEC Logic 312, as described further below with reference to FIGS. 9-11.

Figure 8:
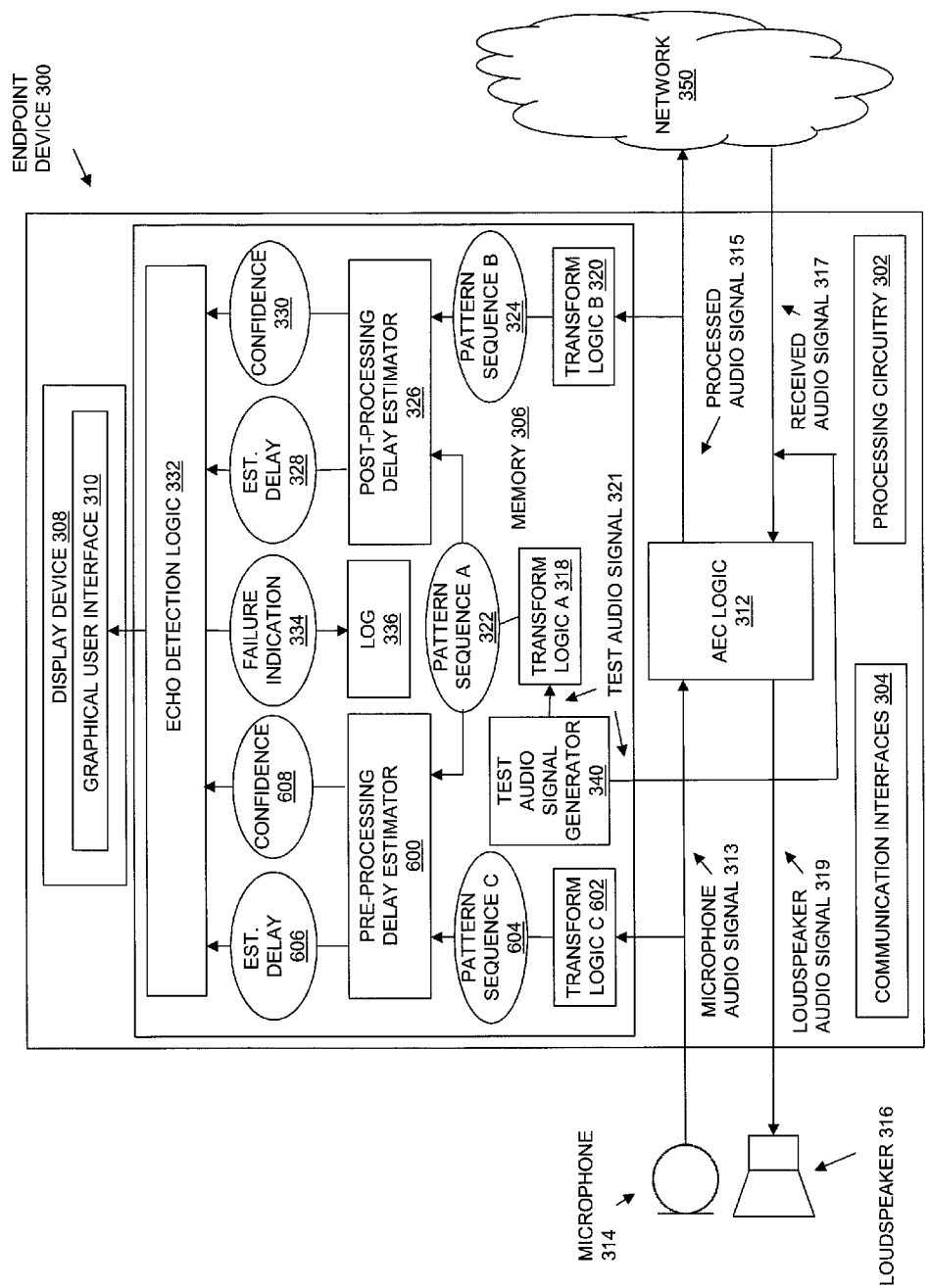
FIG. 8 is a block diagram showing an embodiment in which two delay estimators are used to detect failure of the acoustic echo cancelling component, and in which a test audio signal generator is used to generate an artificial test audio signal.

FIG. 8 is a block diagram showing an embodiment in which two delay estimators are used to detect failure of the acoustic echo cancelling component, and which a test audio signal generator is used to generate an artificial test audio signal. As described above, the known audio signal conveyed to Post-Processing Delay Estimator 326 and Pre-Processing Delay Estimator 600 may consist of or include audio of a real-time communication session that is received by Endpoint Device 300 during the real time communication session, and that is also passed to Loudspeaker 316 as Loudspeaker Audio Signal 319 for output as sound by Loudspeaker 316. Alternatively, or in addition, and as similarly described above with reference to embodiments using a single delay estimator, the known audio signal passed to Loudspeaker 316, Post-Processing Delay Estimator 326 and Pre-Processing Delay Estimator 600 may consist of or include a test audio signal that is generated in the endpoint device, such as, for example, a tone, a ring tone, noise, etc. Accordingly, as shown in FIG. 8, the Test Audio Signal Generator 340 may also be provided (e.g. as program code executable on Processing Circuitry 302) to generate Test Audio Signal 321 in embodiments using multiple delay estimators. As shown in FIG. 8, Test Audio Signal 321 may be passed as the known audio signal to both Pre-Processing Delay Estimator 600 and Post-Processing Delay Estimator 326, either directly or through Transform Logic A 318 as Pattern Sequence A 322. As also shown in FIG. 8, and as similarly described above with reference to single delay estimator embodiments, Test Audio Signal 321 may be added to the Received Audio Signal 317, prior to input of the Received Audio Signal 317 by the AEC Logic 312, resulting in the Loudspeaker Audio Signal 319 that is output from AEC Logic 312 including the Test Audio Signal 321, as well as any audio in Received Audio Signal 317 that might be present. As described above, Test Audio Signal 321 may be audible or inaudible, with an inaudible Test Signal 321 allowing the Test Audio Signal 321 to be safely generated during a real-time voice communication session without interfering with the real-time voice communication session.

Figure 9:
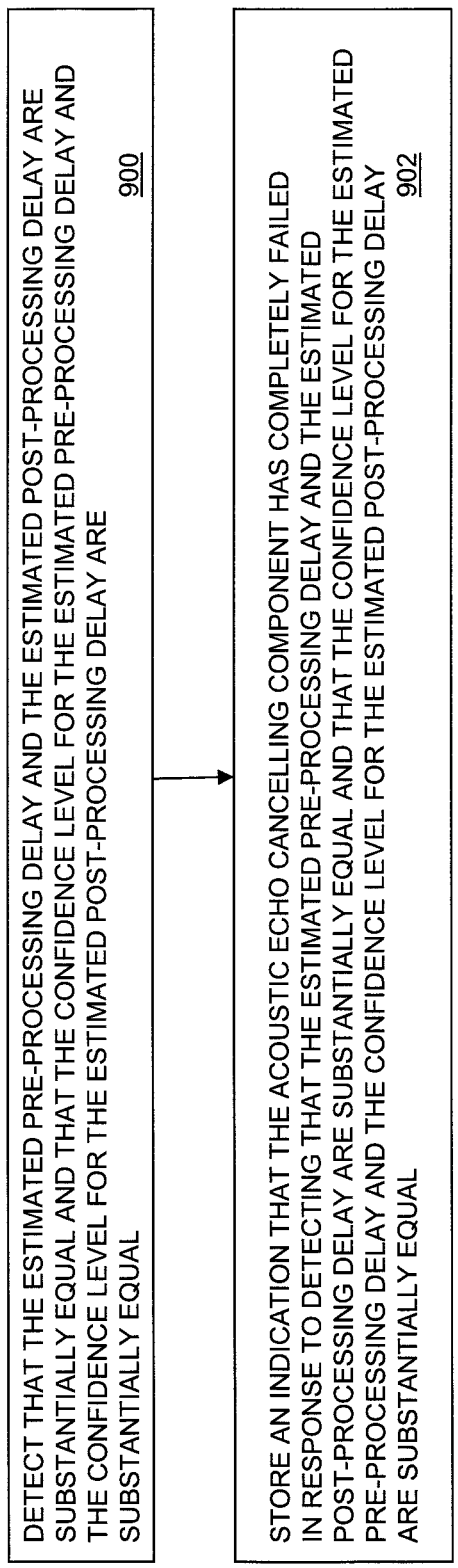
FIG. 9 is a flow chart showing an example of steps that may be performed in an embodiment in which two delay estimators are used to detect that the acoustic echo cancelling component has completely failed.

FIG. 9 is a flow chart showing an example of steps that may be performed in an embodiment in which two delay estimators are used, in order to detect that the acoustic echo cancelling component has completely failed. The steps of FIG. 9 may, for example, be performed by the Echo Detection Logic 332 in response to the comparisons performed in steps 706 and 708 of FIG. 7. At step 900, the Echo Detection Logic 332 detects that the estimated pre-processing delay (e.g. Estimated Delay 606) and the estimated post-processing delay (e.g. Estimated Delay 328) are substantially equal, and that the confidence level for the estimated pre-processing delay (e.g. Confidence 608) and the confidence level for the estimated post-processing delay (e.g. Confidence 330) are substantially equal. For example, Estimated Delay 606 may be determined to be substantially equal to Estimated Delay 328 if the difference between Estimated Delay 606 and Estimated Delay 328 is less than a maximum permitted difference. Such a maximum permitted difference may for example, be a predetermined absolute difference, such that Estimated Delay 606 is determined to be substantially equal to Estimated Delay 328 if the difference between Estimated Delay 606 and Estimated Delay 328 is less than the predetermined absolute difference. Confidence 608 may be determined to be substantially equal to Confidence 330 if the difference between Confidence 608 and Confidence 330 is less than a predetermined percentage (e.g. twenty percent) of Confidence 330.

At step 902, in response to detecting at step 900 that the Estimated Delay 606 and that Estimated Delay 328 are substantially equal and Confidence 608 and Confidence 330 are substantially equal, Echo Detection Logic 332 stores an indication that AEC Logic 312 has completely failed in Endpoint Device 300, for example as part of or in addition to storing Failure Indication 334 as a log entry in Log 336. Alternatively, or in addition, at step 902 Echo Detection Logic 332 may display a visual indication that AEC Logic 312 has completely failed to a user of Endpoint Device 300, e.g. as part of Graphical User Interface 310.

Figure 10:
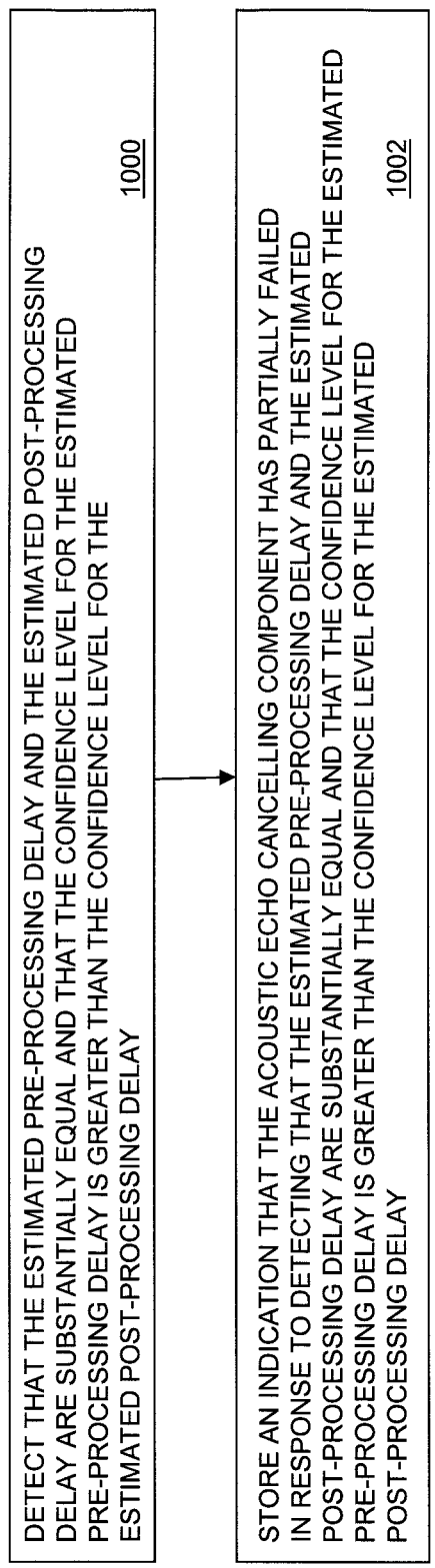
FIG. 10 is a flow chart showing an example of steps that may be performed in an embodiment in which two delay estimators are used to detect that the acoustic echo cancelling component has partially failed.

FIG. 10 is a flow chart showing an example of steps that may be performed in an embodiment in which two delay estimators are used, in order to detect that the acoustic echo cancelling component has partially failed. The steps of FIG. 10 may, for example, be performed by the Echo Detection Logic 332 in response to the comparisons performed in steps 706 and 708 of FIG. 7. At step 1000, the Echo Detection Logic 332 detects that the estimated pre-processing delay (e.g. Estimated Delay 606) and the estimated post-processing delay (e.g. Estimated Delay 328) are substantially equal, and that the confidence level for the estimated pre-processing delay (e.g. Confidence 608) is greater than the confidence level for the estimated post-processing delay (e.g. Confidence 330).

At step 1002, in response to detecting at step 1000 that Estimated Delay 606 and Estimated Delay 328 are substantially equal, and that Confidence 608 is greater than Confidence 330, Echo Detection Logic 332 stores an indication that AEC Logic 312 has partially failed in Endpoint Device 300, for example as part of or in addition to storing Failure Indication 334 as a log entry in Log 336. Alternatively, or in addition, at step 1002 Echo Detection Logic 332 may display a visual indication that AEC Logic 312 has partially failed to a user of Endpoint Device 300, e.g. as part of Graphical User Interface 310.

Figure 11:
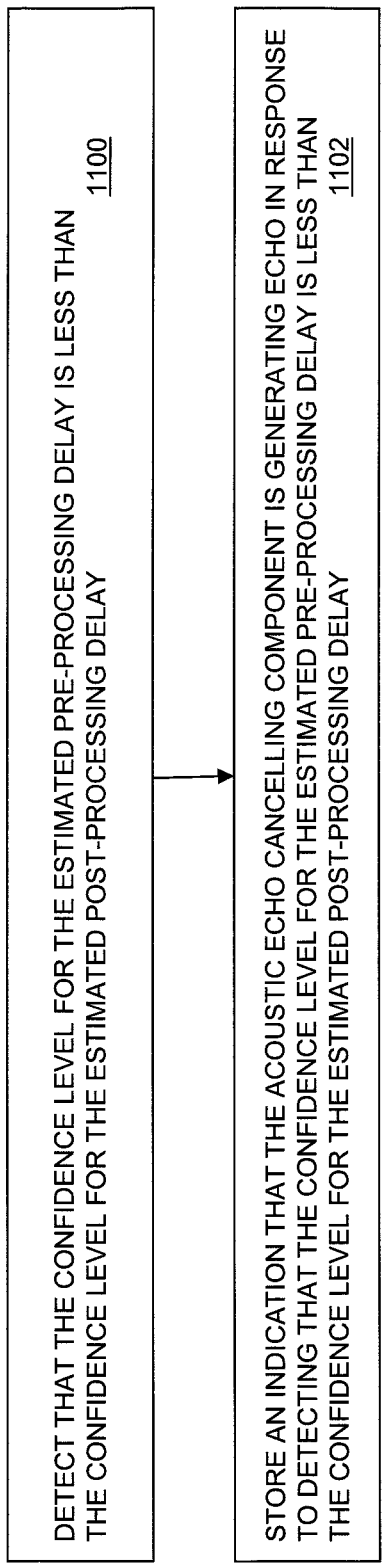
FIG. 11 is a flow chart showing an example of steps that may be performed in an embodiment in which two delay estimators are used to detect that the acoustic echo cancelling component is generating echo.

FIG. 11 is a flow chart showing an example of steps that may be performed in an embodiment in which two delay estimators are used, in order to detect that the acoustic echo cancelling component is generating echo. The steps of FIG. 11 may, for example, be performed by the Echo Detection Logic 332 in response to the comparisons performed in steps 706 and 708 of FIG. 7. At step 1100, the Echo Detection Logic 332 detects that the confidence level for the estimated pre-processing delay (e.g. Confidence 608) is less than the confidence level for the estimated post-processing delay (e.g. Confidence 330).

At step 1102, in response to detecting at step 1100 that Confidence 608 is less than Confidence 330, Echo Detection Logic 332 stores, in Endpoint Device 300, an indication that AEC Logic 312 is generating echo, for example as part of or in addition to storing Failure Indication 334 as a log entry in Log 336. Alternatively, or in addition, at step 1002 Echo Detection Logic 332 may display a visual indication, to a user of Endpoint Device 300, e.g. as part of Graphical User Interface 310, that AEC Logic 312 is generating echo.

Figure 12:
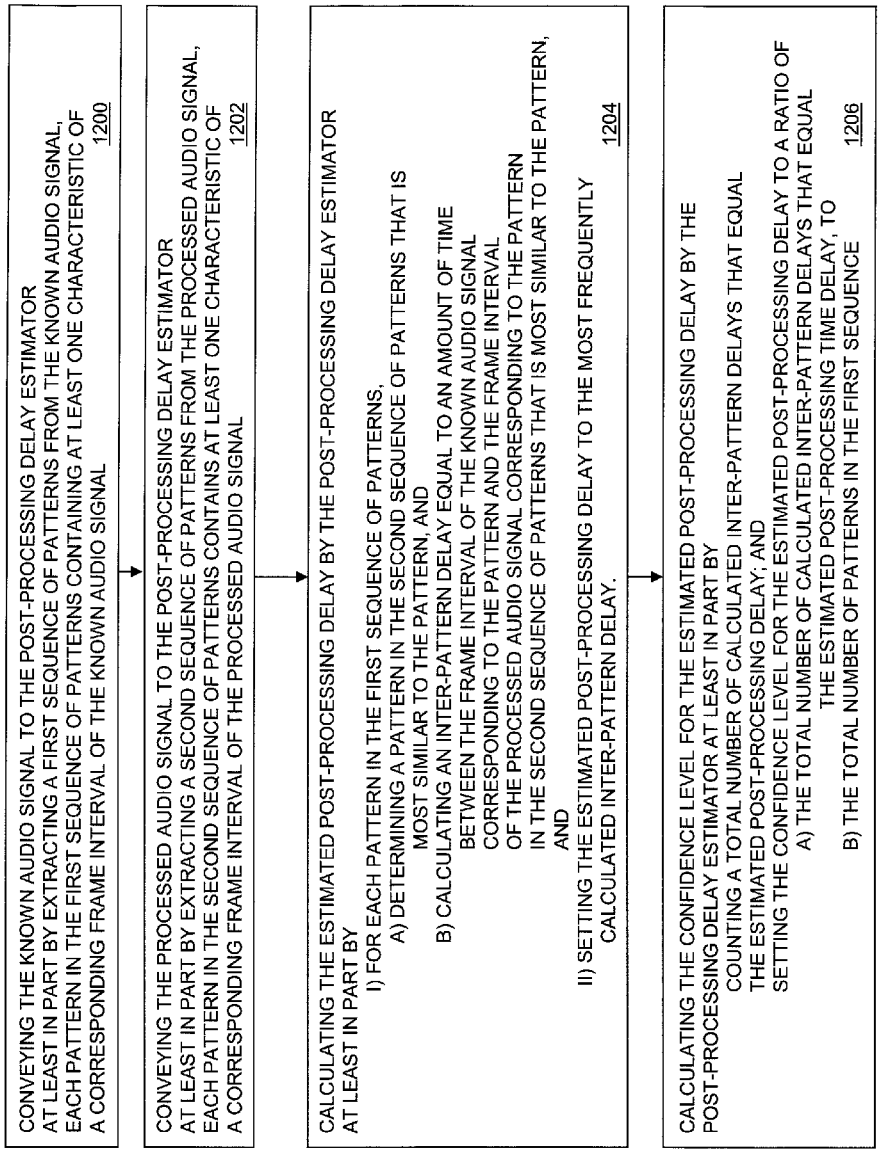
FIG. 12 is a flow chart showing an example of steps that may be performed by a delay estimator to generate an estimated delay and a confidence level.

FIG. 12 is a flow chart showing an example of steps that may be performed by a delay estimator to generate an estimated delay and a confidence level. The steps of FIG. 12 may, for example, be performed by Post-Processing Delay Estimator 326, Transform Logic A 318, and Transform Logic B 320. While FIG. 12 specifically illustrates the operation of the Post-Processing Delay Estimator 326 with regard to processing a known audio signal and Processed Audio Signal 315, Pre-Processing Delay Estimator 600 may be embodied similarly with regard to processing known audio signal and Microphone Audio Signal 313.

As shown in FIG. 12, at step 1200 Transform Logic A 318 conveys the known audio signal to Post-Processing Delay Estimator 326 at least in part by extracting a first sequence of patterns from the known audio signal, as illustrated by Pattern Sequence A 322. Each pattern in Pattern Sequence A 322 contains at least one characteristic of a corresponding frame interval of the known audio signal. For example, each pattern in Pattern Sequence A 322 may contain one or more characteristics of a corresponding ten milliseconds of the known audio signal. Characteristics that may be stored in each pattern include an indication of an amount of energy present for one or more frequencies or frequency bands during the frame interval. For example, each pattern may contain a value indicating an average or peak amount of energy in the corresponding frame interval for one or more frequencies that are typically significant in speech communications, such as one kilohertz.

At step 1202 Transform Logic B 320 conveys the Processed Audio Signal 315 to Post-Processing Delay Estimator 326 at least in part by extracting a second sequence of patterns from the Processed Audio Signal 315, as illustrated by Pattern Sequence B 324. Each pattern in Pattern Sequence B 322 contains at least one characteristic of a corresponding frame interval of the Processed Audio Signal 326. For example, each pattern in Pattern Sequence B 324 may contain one or more characteristics of a corresponding ten milliseconds of the Processed Audio Signal 326. The characteristic or characteristics stored in each pattern in Pattern Sequence B 324 are the same as the characteristic or characteristics stored in each pattern in Pattern Sequence A 322. For example, in the case where each pattern in Pattern Sequence A 322 indicates the peak amount of energy at one kilohertz in a corresponding frame interval of the known audio signal, each pattern in Pattern Sequence B 324 indicates the peak amount of energy at one kilohertz in a corresponding frame interval of the Processed Audio Signal 315.

At step 1204, Post-Processing Delay Estimator 326 calculates Estimated Delay 328 by first, for each pattern in Pattern Sequence A 322, a) determining a pattern in Pattern Sequence B 324 that is most similar to the pattern in Pattern Sequence A 322, and b) calculating an inter-pattern delay equal to an amount of time between the frame interval in the known audio signal that corresponds to the pattern in Pattern Sequence A 322 and the frame interval of the Processed Audio Signal 315 that corresponds to the pattern in Pattern Sequence B 324 that is most similar to the pattern in Pattern Sequence A 322. After all the patterns in Pattern Sequence A 322 have been processed in this way, Post-Processing Delay Estimator 326 sets Estimated Delay 328 the most frequently calculated inter-pattern delay between Pattern Sequence A 322 and Pattern Sequence B 324.

At step 1206, Post-Processing Delay Estimator 326 calculates Confidence 330 by i) counting a total number of the inter-pattern delays calculated in step 1204 that equal Estimated Delay 328, and ii) setting Confidence 330 to a ratio of a) the total number of inter-pattern delays calculated in step 1204 that equal Estimated Delay 328, to b) a total number of patterns in Pattern Sequence A 322.

Figure 13:
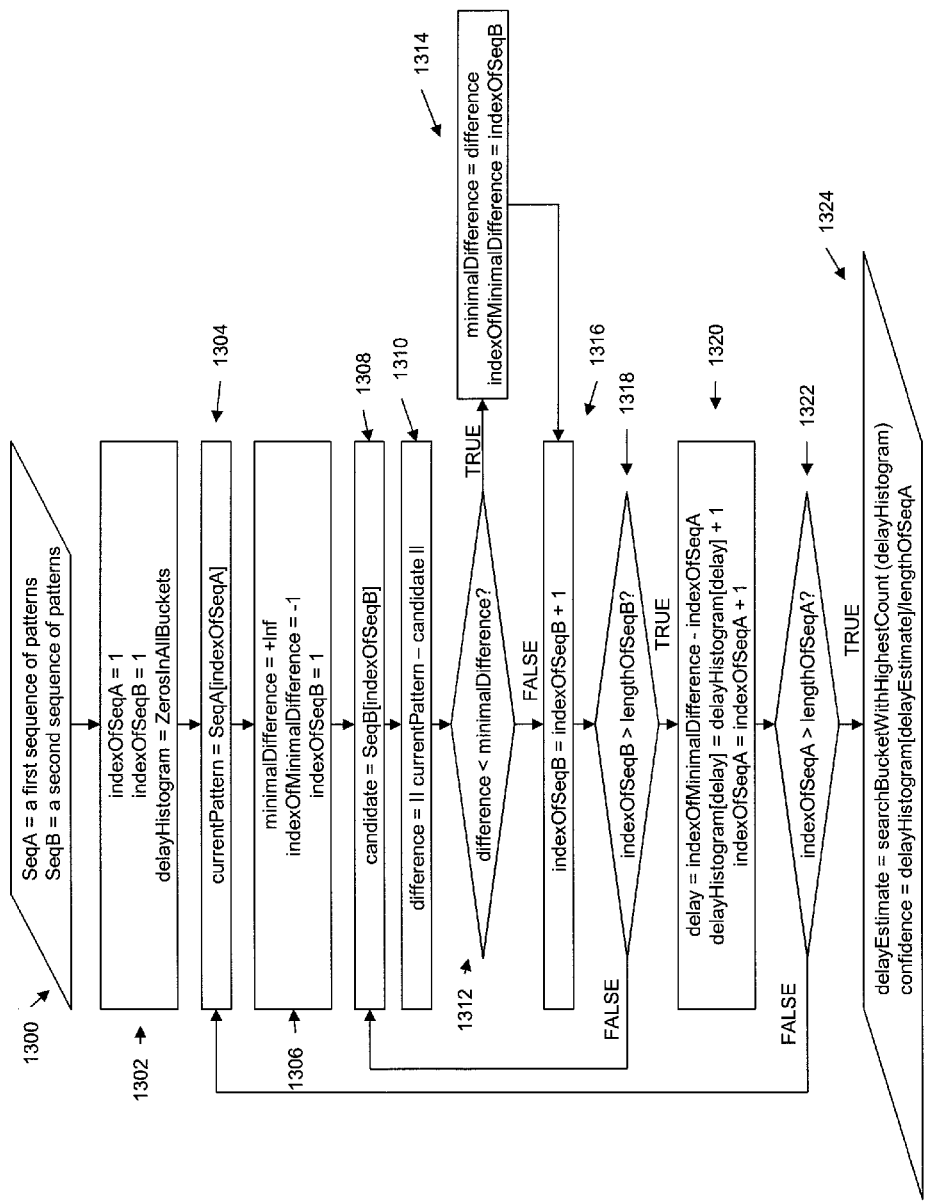
FIG. 13 is a flow chart further illustrating an example of steps that may be performed by a delay estimator to generate an estimated delay and a confidence level.

FIG. 13 is a flow chart further illustrating an example of steps that may be performed by a delay estimator to generate an estimated delay and a confidence level, using informal pseudocode. At step 1300, the delay estimator receives a first sequence of patterns "SeqA" and a second sequence of patterns "SeqB". At step 1302, "indexOfSeqA" is set to one, "indexOfSeqB" is set to one, and all the buckets within a delay histogram "delayHistogram" are set to zero. In the example of FIG. 13, "indexOfSeqA" is used as an index for indicating specific individual patterns contained in "SeqA", "indexOfSeqB" is used as an index for indicating specific individual patterns in "SeqB", and "delayHistogram" is a histogram of buckets in which each bucket is used to count the number of inter-pattern delays that match a specific delay range. For example, the bucket "delayHistogram[1]" is used to count the number of inter-pattern delays that are within the range of zero to ten milliseconds, the bucket "delayHistogram[2]" is used to count the number of inter-pattern delays that are within the range of eleven to twenty milliseconds, the bucket "delayHistogram[3]" is used to count the number of inter-pattern delays that are within the range of twenty one to thirty milliseconds, and so on. While in this example the delay ranges are given in terms of integer delay values for purposes of concise explanation, those skilled in the art will recognize that non-integer delay values may be used by the disclosed techniques in the alternative.

At step 1304, a next pattern within "SeqA" is selected for processing by setting "currentPattern" to "SeqA[indexOfSeqA]".

At step 1306, "minimalDifference" is set to an initial maximum value, "indexOfMinimalDifference" is set to negative one, and indexOfSeqB is set to one. In the example of FIG. 13, "minimalDifference" is used to store a minimal difference for "candidate" with respect to the patterns in "SeqB", and "indexOfMinimalDifference" is used to store the index into "SeqB" of a pattern in "SeqB" that is most similar to "currentPattern".

At step 1308 a next pattern within "SeqB" is selected for processing by setting "candidate" to "SeqB [indexOfSeqB]".

At step 1310, "difference" is set to the difference between "currentPattern" and "candidate". For example, in the case where each pattern indicates a peak amount of energy at a specific frequency within a corresponding frame interval, then "difference" is set to an amount of energy that is the difference between the amount of energy indicated by "currentPattern" and the amount of energy indicated by "candidate". For embodiments using higher dimensional patterns, "difference" may be calculated based on a Euclidean distance between "currentPattern" and "candidate". At step 1312, "difference" is compared to "minimalDifference". If "difference" is less than "minimalDifference", then "candidate" is now the pattern in "SeqB" that is most similar to "currentPattern", and step 1312 is followed by step 1314, in which "minimalDifference" is updated to "difference", and "indexOfMinimalDifference" is set to "indexOfSeqB". Step 1314 is followed by step 1316.

Otherwise, if "difference" is not less than "minimalDifference", then step 1312 is followed by step 1316, in which "indexOfSeqB" is incremented.

At step 1318, "indexOfSeqB" is compared to "lengthOfSeqB" to determine if all patterns in "SeqB" have been processed for "currentPattern". The value of "lengthOfSeqB" is the number of patterns in "SeqB". If "indexOfSeqB" not greater than "lengthOfSeqB", then step 1318 is followed by step 1308. Otherwise, if "indexOfSeqB" is greater than "lengthOfSeqB", then step 1318 is followed by step 1320.

At step 1320, all the patterns in "SeqB" have been processed for "currentPattern", and accordingly a pattern within "SeqB" that is most similar to "currentPattern" has been identified, and the index of that pattern within "SeqB" is contained in "indexOfMinimalDifference". An index "delay" into "delayHistogram" is then set to the difference between "indexOfMinimalDifference" and "indexOfSeqA". In the example of FIG. 13, "delay" represents the number of frame intervals between the frame interval in the known audio signal corresponding to "currentPattern" and the frame interval in Processed Audio Signal 315 corresponding to the pattern within "SeqB" that is most similar to "currentPattern". Further in step 1320, "delay" is used to index into "delayHistogram" to locate the bucket in "delayHistogram" that is to be incremented for the inter-pattern delay calculated for "currentPattern" (e.g. by setting "delayHistogram[delay]" to "delayHistogram[delay]"+1). For example, in the case where "delay" has a value of three, then the number of frame intervals between the frame interval in the known audio signal corresponding to "currentPattern" and the frame interval in Processed Audio Signal 315 corresponding to the pattern within "SeqB" that is most similar to "currentPattern" is three. In an example in which each frame interval equals ten milliseconds, the inter-pattern delay for "currentPattern" is accordingly thirty milliseconds, and the bucket to be incremented in "delayHistogram" is "delayHistogram[3]". Thus "delayHistogram[3]" stores a count of the number of inter-pattern delays equal to thirty milliseconds calculated for the patterns in "SeqA" with regard to the patterns in "SeqB". Also in step 1320, "indexOfSeqA" incremented. At step 1322, "indexOfSeqA" is compared to "lengthOfSeqA" to determine if all patterns in "SeqA" have been processed. The value of "lengthOfSeqA" is the number of patterns in "SeqA". If "indexOfSeqA" not greater than "lengthOfSeqA", then step 1322 is followed by step 1304 so that the next pattern in "SeqA" can be processed. Otherwise, if "indexOfSeqA" is greater than "lengthOfSeqA", then step 1322 is followed by step 1324.

At step 1324, all patterns in "SeqA" have been processed, and "delayEstimate" is set to the index into "delayHistogram" of the bucket having the highest count, i.e. the bucket corresponding to the most frequently calculated inter-pattern delay. For example, if at step 1324 the bucket in "delayHistogram" with highest count is "delayHistogram[3]", then "delayEstimate" is set to three. Estimated Delay 328 is then set to the delay corresponding to a "delay" of 3, which is the number of frame intervals in the estimated delay, multiplied by the frame interval size. For example, where the frame interval size is 10 milliseconds, the resulting value for Estimated Delay 328 when "delay" is 3 would be thirty milliseconds. Further at step 1324, Confidence 330 is set to the ratio of a) the total number of calculated inter-pattern delays that equal Estimated Delay 328, which is the count stored in "delayHistogram[delayEstimate]", to b) the total number of patterns in "SeqA" (i.e. "lengthOfSeqA"). For example, in the case where the total number of patterns in "SeqA" is ten, and the total number of calculated inter-pattern delays that equal Estimated Delay 328 is eight, then Confidence 330 is set to a probability of eighty percent.

Figure 14:
FIG. 14 is a block diagram illustrating an inter-pattern delay.

FIG. 14 is a block diagram illustrating an inter-pattern delay. As shown in FIG. 14, an example of Pattern Sequence A 322 includes a number of patterns, shown as Pattern A1, Pattern A2, Pattern A3, and so on through Pattern A10. Each pattern in Pattern Sequence A 322 corresponds to a frame interval of time within the known audio signal. For example, each pattern in Pattern Sequence A 322 corresponds to a ten millisecond interval of time within the known audio signal.

An example of Pattern Sequence B 324 includes a number of patterns, shown as Pattern B1, Pattern B2, Pattern B3, and so on through Pattern B10. Each pattern in Pattern Sequence B 324 corresponds to a frame interval of time within the Processed Audio Signal 315. For example, each pattern in Pattern Sequence B 324 corresponds to a ten millisecond interval of time within the Processed Audio Signal 315.

FIG. 14 illustrates an Inter-Pattern Delay 1404 between Pattern A1 in Pattern Sequence A 322, and Pattern B4 in Pattern Sequence B 324. Pattern B4 is the pattern in Pattern Sequence B 324 that is most similar to Pattern A1. The value of Inter-Pattern Delay 1404 is equal to an amount of time between the frame interval of the known audio signal corresponding to Pattern A1 and the frame interval of the Processed Audio Signal 315 corresponding to Pattern B4. For example, in the case where each frame interval has a duration of ten milliseconds, Inter-Pattern Delay 1404 would be equal to thirty milliseconds.

While FIGS. 12-14 and the associated text above describe the structure and operation of one possible type of delay estimator that may be used to embody the disclosed techniques, those skilled in the art will recognize that the disclosed techniques do not rely on a specific type of delay estimator to be effective. For example, while the delay estimators shown in FIGS. 12-14 and described above perform pattern comparison between pattern sequences on an individual pattern by pattern basis, other types of delay estimators may operate by performing comparisons between pattern sequences across multiple patterns simultaneously. Accordingly, the disclosed techniques are not limited to embodiments that use delay estimators that operate as shown in FIGS. 12-14 and as described above in the associated text, and other specific types of delay estimators may be effectively used in the alternative.

Regardless of the specific type or number of delay estimators used, the accuracy of the confidence level output by each delay estimator may highly influence the quality of the failure detection provided by embodiments of the disclosed techniques. In order to improve the operation of a given delay estimator, the confidence level output by the delay estimator may be weighted based on the variance of the estimated delay output by the delay estimator over time. Accordingly, the disclosed techniques may be embodied to collect estimated delays generated by each delay estimator over time to determine the stability of each delay estimator. In most operational environments, the actual delay that is being estimated by a delay estimator is constant over time. Accordingly, the estimated delays generated over time by a given delay estimator should only exhibit small levels of variation. The disclosed techniques may be embodied to derive a weighting value to be applied to the confidence level generated by a given delay estimator, where the weighting value is a function of the variance of the delay estimates generated by the delay estimator. The specific function used to generate the weighting value may have a maximum weighting value at a zero variance (indicating a high delay estimator accuracy), and be monotonically decreasing with increased variance. In addition, this weighting value may be used in the case where a delay estimator does not provide a confidence level, by applying the weighting value to a fixed value and using the result as a confidence level.

In other words, for a given delay estimator, a weighted confidence level may be calculated as follows (e.g. by the Echo Detection Logic 332):

"weighted confidence level"="weighting value"*"confidence level"

In the above equation, the "confidence level" may either be i) calculated and delivered to the Echo Detection Logic 332 by the delay estimator, or ii) a fixed predetermined constant. This constant can, for example, be determined empirically by measuring the accuracy of the delay estimator for a set of scenarios with known delays.

The "weighting value" may be calculated as follows:

"weighting value"=max(0,1−("variance of the estimated delay"/"variance tolerance"))

Where max(a, b) is a function that outputs the largest value of "a" and "b". The "variance of the estimated delay" is the variance of the estimated delay with respect to all or some fixed number (e.g. the last 100) of the estimated delays previously generated by the delay estimator. The "variance tolerance" is a predetermined constant having a value that guarantees that variances above "variance tolerance" will reduce the confidence level to zero, i.e. have the meaning of being completely unreliable.

Accordingly, when two confidence levels are compared by the disclosed techniques, the comparison may be of the respective "weighted confidence levels" calculated as described above. Similarly, when a confidence level is compared to a threshold, the comparison may be of the "weighted confidence level" calculated as described above.

Those skilled in the art will recognize that standard deviation may be used as an alternative to variance. Those skilled in the art will recognize that various modifications may be made to the disclosed technology. For example, while the above description describes embodiments which include one or two delay estimators, the disclosed techniques are not limited to such approaches. Accordingly, the disclosed techniques may alternatively be embodied using more than two delay estimators. For example, some acoustic echo cancelling components may include multiple sub-components for performing sequential stages of echo cancellation, such as linear and non-linear components, for performing linear and non-linear stages of operation respectively. In such a case, the disclosed techniques may be embodied to provide a separate delay estimator at each operational stage of the acoustic echo cancelling component, in order to accurately detect specific types of failure conditions, and the total number of delay estimators used in such embodiments may exceed two.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above. For example, while in the above description examples of confidence levels and/or failure indications (e.g. Confidence 330, Confidence 608, and/or Failure Indication 334) are described as being made up of or including a "probability", those skilled in the art will recognize that such probabilities can be represented in various specific ways, e.g. by a value between 0 and 100, or by a value representing a probability in some other specific range, e.g. 1000-9999, etc.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied at least in part in one or more non-transitory computer readable storage medium(s) having computer readable program code stored thereon for causing one or more processors and/or a computer system to carry out those aspects of the present disclosure.

Any combination of one or more non-transitory computer readable storage medium(s) may be utilized. Examples of a non-transitory computer readable storage medium include, but are not limited to, an optical disc (e.g. CD or DVD), an optical storage device, a magnetic disk, a magnetic storage device, a random access memory (RAM), a read-only memory (ROM), an erasable programmable read-only memory (EPROM or Flash memory), and/or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

While the invention is described through the above exemplary embodiments, it will be understood by those of ordinary skill in the art that modification to and variation of the illustrated embodiments may be made without departing from the inventive concepts herein disclosed.

What is claimed is:

1. A method of detecting failure of an acoustic echo cancelling component in an endpoint device, the method comprising:
    conveying a known audio signal i) to a loudspeaker communicably coupled to the endpoint device, wherein the loudspeaker outputs the known audio signal as sound, and ii) to a post-processing delay estimator;
    conveying a processed audio signal to the post-processing delay estimator, wherein the post-processing audio signal is generated by the acoustic echo cancelling component in response to a microphone audio signal received by the acoustic echo cancelling component from a microphone communicably coupled to the endpoint device;
    calculating, by the post-processing delay estimator in response to the known audio signal and the processed audio signal, an estimated post-processing delay that is an estimate of an amount of time between conveying the known audio signal to the loudspeaker and outputting of a portion of the processed audio signal that includes the known audio signal from the acoustic echo cancelling component;
    calculating a confidence level for the estimated post-processing delay, wherein the confidence level for the estimated post-processing delay is a probability that the estimated post-processing delay is an actual amount of time between conveying the known audio signal to the loudspeaker and outputting the portion of the processed audio signal that includes the known audio signal from the acoustic echo cancelling component, and wherein calculating the confidence level for the estimated post-processing delay includes:
        calculating a weighting value based on a variance of the estimated post-processing delay, and
        calculating the confidence level for the estimated post-processing delay as a product of the weighting value and a fixed value;
    comparing the confidence level for the estimated post-processing delay to a minimum confidence level threshold; and
    in response to detecting that the confidence level for the estimated post-processing delay exceeds the minimum confidence level threshold i) detecting that the acoustic echo cancelling component has failed, and ii) storing an indication that the acoustic echo cancelling component has failed in a memory of the endpoint device.

2. The method of claim 1, wherein calculating the confidence level for the estimated post-processing delay is performed by the post-processing delay estimator.

3. The method of claim 1, further comprising:
    conveying the known audio signal to a pre-processing delay estimator;
    conveying the microphone audio signal to the pre-processing delay estimator;
    calculating, by the pre-processing delay estimator in response to the known audio signal and the microphone audio signal, an estimated pre-processing delay that is an estimate of an amount of time between conveying the known audio signal to the loudspeaker and outputting of a portion of the microphone audio signal that includes the known audio signal from the microphone;
    calculating a confidence level for the estimated pre-processing delay, wherein the confidence level for the estimated pre-processing delay is a probability that the estimated pre-processing delay is an actual amount of time between conveying the known audio signal to the loudspeaker and outputting the portion of the microphone audio signal that includes the known audio signal from the microphone;
    comparing the estimated pre-processing delay to the estimated post-processing delay;
    comparing the confidence level for the estimated pre-processing delay to the confidence level for the estimated post-processing delay; and
    wherein storing the indication that the acoustic echo cancelling component has failed includes storing an indication that the acoustic echo cancelling component has completely failed in response to detecting that the estimated pre-processing delay and the estimated post-processing delay are substantially equal and that the confidence level for the estimated pre-processing delay and the confidence level for the estimated post-processing delay are substantially equal.

4. The method of claim 3, wherein storing the indication that the acoustic echo cancelling component has failed includes storing an indication that the acoustic echo cancelling component has partially failed in response to detecting that the estimated pre-processing delay and the estimated post-processing delay are substantially equal and that the confidence level for the estimated pre-processing delay is greater than the confidence level for the estimated post-processing delay.

5. The method of claim 4, wherein storing the indication that the acoustic echo cancelling component has failed includes storing an indication that the acoustic echo cancelling component is generating echo in response to detecting that the confidence level for the estimated pre-processing delay is less than the confidence level for the estimated post-processing delay.

6. The method of claim 5, further comprising:
receiving, by the endpoint device during a real-time communication session, audio of the real-time communication session originating from at least one remote endpoint device; and
wherein the known audio signal comprises the audio of the real-time communication session received by the endpoint device during the real time communication session.

7. The method of claim 5, further comprising:
generating a test audio signal in the endpoint device; and
wherein the known audio signal comprises the test audio signal generated in the endpoint device.

8. The method of claim 7, wherein the test audio signal is outside the range of human hearing, and further comprising generating the test audio signal during a real-time communication session.

9. The method of claim 1, further comprising generating a warning to a user of the endpoint device in response to detecting that the confidence level for the estimated post-processing delay exceeds the minimum confidence level threshold, wherein the warning indicates that the acoustic echo cancelling component has failed.

10. The method of claim 1, further comprising passing the estimated post-processing delay to the acoustic echo cancelling component in response to detecting that the confidence level for the estimated post-processing delay exceeds the minimum confidence level threshold.

11. The method of claim 10, further comprising causing the echo cancelling component to be reset in response to detecting that the confidence level for the estimated post-processing delay exceeds the minimum confidence level threshold.

12. A method of detecting failure of an acoustic echo cancelling component in an endpoint device, the method comprising:
conveying a known audio signal i) to a loudspeaker communicably coupled to the endpoint device, wherein the loudspeaker outputs the known audio signal as sound, and ii) to a post-processing delay estimator;
conveying a processed audio signal to the post-processing delay estimator, wherein the post-processing audio signal is generated by the acoustic echo cancelling component in response to a microphone audio signal received by the acoustic echo cancelling component from a microphone communicably coupled to the endpoint device;
calculating, by the post-processing delay estimator in response to the known audio signal and the processed audio signal, an estimated post-processing delay that is an estimate of an amount of time between conveying the known audio signal to the loudspeaker and outputting of a portion of the processed audio signal that includes the known audio signal from the acoustic echo cancelling component;
calculating a confidence level for the estimated post-processing delay, wherein the confidence level for the estimated post-processing delay is a probability that the estimated post-processing delay is an actual amount of time between conveying the known audio signal to the loudspeaker and outputting the portion of the processed audio signal that includes the known audio signal from the acoustic echo cancelling component;
comparing the confidence level for the estimated post-processing delay to a minimum confidence level threshold;
in response to detecting that the confidence level for the estimated post-processing delay exceeds the minimum confidence level threshold i) detecting that the acoustic echo cancelling component has failed, and ii) storing an indication that the acoustic echo cancelling component has failed in a memory of the endpoint device;
wherein conveying the known audio signal to the post-processing delay estimator includes extracting a first sequence of patterns from the known audio signal, wherein each pattern in the first sequence of patterns contains at least one characteristic of a corresponding frame interval of the known audio signal; and
wherein conveying the processed audio signal to the post-processing delay estimator includes extracting a second sequence of patterns from the processed audio signal, wherein each pattern in the second sequence of patterns contains at least one characteristic of a corresponding frame interval of the processed audio signal.

13. The method of claim 12, wherein calculating the estimated post-processing delay by the post-processing delay estimator includes:
for each pattern in the first sequence of patterns,
a) determining a pattern in the second sequence of patterns that is most similar to the pattern, and
b) calculating an inter-pattern delay equal to an amount of time between the frame interval of the known audio signal corresponding to the pattern and the frame interval of the processed audio signal corresponding to the pattern in the second sequence of patterns that is most similar to the pattern; and
setting the estimated post-processing delay to a most frequently calculated inter-pattern delay.

14. An endpoint device, comprising:
processing circuitry; and
memory communicably coupled to the processing circuitry, the memory storing program code for detecting failure of an acoustic echo cancelling component in the endpoint device, wherein the program code, when executed by the processing circuitry, causes the processing circuitry to:
convey a known audio signal i) to a loudspeaker communicably coupled to the endpoint device, wherein the loudspeaker outputs the known audio signal as sound, and ii) to a post-processing delay estimator;

convey a processed audio signal to the post-processing delay estimator, wherein the post-processing audio signal is generated by the acoustic echo cancelling component in response to a microphone audio signal received by the acoustic echo cancelling component from a microphone communicably coupled to the endpoint device;

calculate, by the post-processing delay estimator in response to the known audio signal and the processed audio signal, an estimated post-processing delay that is an estimate of an amount of time between conveying the known audio signal to the loudspeaker and outputting of a portion of the processed audio signal that includes the known audio signal from the acoustic echo cancelling component;

calculate a confidence level for the estimated post-processing delay, wherein the confidence level for the estimated post-processing delay is a probability that the estimated post-processing delay is an actual amount of time between conveying the known audio signal to the loudspeaker and outputting the portion of the processed audio signal that includes the known audio signal from the acoustic echo cancelling component, and wherein the confidence level for the estimated post-processing delay is calculated at least in part by:
  calculating a weighting value based on a variance of the estimated post-processing delay, and
  calculating the confidence level for the estimated post-processing delay as a product of the weighting value and a fixed value;

compare the confidence level for the estimated post-processing delay to a minimum confidence level threshold; and in response to detecting that the confidence level for the estimated post-processing delay exceeds the minimum confidence level threshold, i) detect that the acoustic echo cancelling component has failed, and ii) store an indication that the acoustic echo cancelling component has failed in the memory.

15. The endpoint device of claim 14, wherein the confidence level for the estimated post-processing delay is calculated by the post-processing delay estimator.

16. The endpoint device of claim 14, wherein the program code, when executed by the processing circuitry, further causes the processing circuitry to:
  convey the known audio signal to a pre-processing delay estimator;
  convey the microphone audio signal to the pre-processing delay estimator;
  calculate, by the pre-processing delay estimator in response to the known audio signal and the microphone audio signal, an estimated pre-processing delay that is estimate of an amount of time between conveying the known audio signal to the loudspeaker and outputting of a portion of the microphone audio signal that includes the known audio signal from the microphone;
  calculate a confidence level for the estimated pre-processing delay, wherein the confidence level for the estimated pre-processing delay is a probability that the estimated pre-processing delay is an actual amount of time between conveying the known audio signal to the loudspeaker and outputting the portion of the microphone audio signal that includes the known audio signal from the microphone;
  compare the estimated pre-processing delay to the estimated post-processing delay;
  compare the confidence level for the estimated pre-processing delay to the confidence level for the estimated post-processing delay; and wherein the indication that the acoustic echo cancelling component has failed is stored by storing an indication that the acoustic echo cancelling component has completely failed in response to detecting that the estimated pre-processing delay and the estimated post-processing delay are substantially equal and that the confidence level for the estimated pre-processing delay and the confidence level for the estimated post-processing delay are substantially equal.

17. The endpoint device of claim 16, wherein the program code, when executed by the processing circuitry, further causes the processing circuitry to store the indication that the acoustic echo cancelling component has failed by storing an indication that the acoustic echo cancelling component has partially failed in response to detecting that the estimated pre-processing delay and the estimated post-processing delay are substantially equal and that the confidence level for the estimated pre-processing delay is greater than the confidence level for the estimated post-processing delay.

18. The endpoint device of claim 17, wherein the program code, when executed by the processing circuitry, further causes the processing circuitry to store the indication that the acoustic echo cancelling component has failed by storing an indication that the acoustic echo cancelling component is generating echo in response to detecting that the confidence level for the estimated pre-processing delay is less than the confidence level for the estimated post-processing delay.

19. A computer program product including a non-transitory computer readable medium which stores program code operable to detect failure of an acoustic echo cancelling component in an endpoint device, the program code comprising:
  program code for conveying a known audio signal i) to a loudspeaker communicably coupled to the endpoint device, wherein the loudspeaker outputs the known audio signal as sound, and ii) to a post-processing delay estimator;
  program code for conveying a processed audio signal to the post-processing delay estimator, wherein the post-processing audio signal is generated by the acoustic echo cancelling component in response to a microphone audio signal received by the acoustic echo cancelling component from a microphone communicably coupled to the endpoint device;
  program code for calculating, by the post-processing delay estimator in response to the known audio signal and the processed audio signal, an estimated post-processing delay that is an estimate of an amount of time between conveying the known audio signal to the loudspeaker and outputting of a portion of the processed audio signal that includes the known audio signal from the acoustic echo cancelling component;
  program code for calculating a confidence level for the estimated post-processing delay, wherein the confidence level for the estimated post-processing delay is a probability that the estimated post-processing delay is an actual amount of time between conveying the known audio signal to the loudspeaker and outputting the portion of the processed audio signal that includes the known audio signal from the acoustic echo cancelling component, and wherein the confidence level for the estimated post-processing delay is calculated at least in part by:

calculating a weighting value based on a variance of the estimated post-processing delay, and calculating the confidence level for the estimated post-processing delay as a product of the weighting value and a fixed value;

program code for comparing the confidence level for the estimated post-processing delay to a minimum confidence level threshold; and program code for, in response to detecting that the confidence level for the estimated post-processing delay exceeds the minimum confidence level threshold, i) detecting that the acoustic echo cancelling component has failed, and ii) storing an indication that the acoustic echo cancelling component has failed in a memory of the endpoint device.

* * * * *